(12) United States Patent
Gschneidner, Jr. et al.

(10) Patent No.: US 6,589,366 B1
(45) Date of Patent: Jul. 8, 2003

(54) METHOD OF MAKING ACTIVE MAGNETIC REFRIGERANT, COLOSSAL MAGNETOSTRICTION AND GIANT MAGNETORESISTIVE MATERIALS BASED ON GD-SI-GE ALLOYS

(75) Inventors: Karl A. Gschneidner, Jr., Ames, IA (US); Alexandra O. Pecharsky, Ames, IA (US); Vitalij K. Pecharsky, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 09/793,822

(22) Filed: Feb. 23, 2001

Related U.S. Application Data

(60) Provisional application No. 60/187,713, filed on Mar. 8, 2000.

(51) Int. Cl.$^7$ .......................... H01F 1/053; F25R 21/00; F25B 9/00
(52) U.S. Cl. .................. 148/301; 148/101; 148/103; 148/121; 62/3.1; 62/6
(58) Field of Search ................. 148/101, 102, 148/103, 301, 303, 120, 121, 122; 62/3.1, 4, 6, 51.1

(56) References Cited

U.S. PATENT DOCUMENTS

| | | | | |
|---|---|---|---|---|
| 5,743,095 | A | * | 4/1998 | Gschneidner et al. ......... 62/3.1 |
| 6,022,486 | A | * | 2/2000 | Tokai et al. .................. 252/67 |
| 6,030,468 | A | * | 2/2000 | Yagi et al. .................. 148/301 |
| 6,336,978 | B1 | * | 1/2002 | Tokai et al. ................ 148/301 |

OTHER PUBLICATIONS

E.M. Levin, V.K. Pecharsky, and K.A. Gschneidner, Jr., "Magnetic field and temperature dependencies of the electrical resistance near the magnetic crystallographic first order phase transition of $Gd_5$ ($Si_2Ge_2$)", Phys. Rev. B60, 7993–7997 (1999).

V.K. Pecharsky and K.A. Gschneidner, Jr., "Phase relationships and Crystallography in the Pseudobinary System $Gd_5Si_4$—$Gd_5Ge_4$,", J. Alloys Compds. 260, 98–106 (1997).

V.K. Pecharsky and K.A. Gschneidner, Jr., "Tunable Magnetic Regenerator Alloyss with a Giant Magnetocaloric Effect for Magnetic Refrigeration from ~20 to~290K", Appl. Phys. Lett. 70, 3299–3301 (1997).

V.K. Pecharsky and K.A. Gschneidner, Jr., "Giant Magnetocaloric Effect in $Gd_5$ ($Si_2Ge_2$)", Phys. Rev. Lett. 78, 4494–4497 (1997).

V.K. Pecharsky and K.A. Gschneidner, Jr., "Effect of Alloying on the Giant Magnetocaloric Effect of $Gd_5$ ($Si_2Ge_2$)", J. Magn. Magn. Mater. 167, L179–L184 (1997).

(List continued on next page.)

*Primary Examiner*—John Sheehan

(57) ABSTRACT

Method of making an active magnetic refrigerant represented by $Gd_5(Si_xGe_{1-x})_4$ alloy for $0 \leq x \leq 1.0$ comprising placing amounts of the commercially pure Gd, Si, and Ge charge components in a crucible, heating the charge contents under subambient pressure to a melting temperature of the alloy for a time sufficient to homogenize the alloy and oxidize carbon with oxygen present in the Gd charge component to reduce carbon, rapidly solidifying the alloy in the crucible, and heat treating the solidified alloy at a temperature below the melting temperature for a time effective to homogenize a microstructure of the solidified material, and then cooling sufficiently fast to prevent the eutectoid decomposition and improve magnetocaloric and/or the magnetostrictive and/or the magnetoresistive properties thereof.

36 Claims, 25 Drawing Sheets

OTHER PUBLICATIONS

T.B. Massalski, Editor–in–Chief, Binary Alloy Phase Diagrams, $2^{nd}$ ed., ASM International, Materials Park, Ohio (1990).

D.H. Dennison, M.J. Tschetter and K.A. Gschneidner, Jr., "The Solubility of Tantalum in Eight Liquid Rare–Earth Metals", J. Less–Common Metals 10, 109–115 (1965).

P. Rogl, "Phase Equilibria in Ternary and Higher Order Systems with Rare Earth Elements and Silicon" in Handbook on the Physics and Chemistry of Rare Earths, K.A. Gschneidner, Jr. and L. Eyring, eds., Elsevier Science Publishers, B.V., Amsterdam, pp. 92–94 (1984).

L. Morellon, P.A. Algarabel, M.R. Ibarra, J. Blasco, and B. Garcia–Landa, "Magnetic–field–induced structural phase transition in $Gd_5$ $(Si_{1.8}Ge_{2.2})$", Phys. Rev. B58, 721–724 (1998).

L. Morellon, J. Stankiewicz, B. Garcia–Landa, P.A. Algarabel, and M.R. Ibarra, "Giant magnetoresistance near the magnetostructural transition in $Gd_5$ $(Si_{1.8}Ge_{2.2})$", Appl. Phys. Lett. 73, 3462–3464 (1998).

L. Morellon, J. Blasco, P.A. Algarabel, and M.R. Ibarra, "Nature of the first–order antiferromagnetic–ferromagnetic transition in the Ge–rich magnetocaloric compounds $Gd_5$ $(Si_xGe_{1-x})_4$", Phys. Rev. B62, 1022–1026 (2000).

J. Stankiewicz, L. Morellon, P.A. Algarabel, and M.R. Ibarra, "Hall effect in $Gd_5$ $(Si_{1.8}Ge_{2.2})$", Phys. Rev. B61, 12651–12653 (2000).

L. Morellon, P.A. Algarabel, C. Magen, and M.R. Ibarra, "Giant magnetoresistance in the Ge–rich magnetocaloric compound, $Gd_5$ $(Si_{0.1}Ge_{0.9})_4$", J. Magn. Magn. Mater. 237, 119–123 (2001).

* cited by examiner

METHOD OF MAKING ACTIVE MAGNETIC REFRIGERANT, COLOSSAL MAGNETOSTRICTION AND GIANT MAGNETORESISTIVE MATERIALS BASED ON GD-SI-GE ALLOYS

RELATED APPLICATION

The application claims benefit of provisional application Ser. No. 60/187,713 filed on Mar. 8, 2000.

CONTRACTUAL ORIGIN OF INVENTION

The United States Government has rights in this invention pursuant to Contract No. W-7405-ENG-82 between the U.S. Department of Energy and Iowa State University, Ames, Iowa, which contract grants to the Iowa State University Research Foundation, Inc. the right to apply for this patent.

FIELD OF THE INVENTION

The present invention relates to magnetic refrigeration, magnetostrictive, and magnetoresistive materials and, more particularly, to methods of making active magnetic refrigerant regenerator alloys, and magnetostrictive and magnetoresistive materials.

BACKGROUND OF THE INVENTION

Magnetic refrigeration is being considered as an alternative technique to gas compressor technology for cooling and heating based on engineering and economic considerations that indicate that magnetic regenerator refrigerators, in principle, are more efficient than gas cycle refrigerators and thus can yield savings in the cost of operation and conservation of energy.

Magnetic refrigeration utilizes the ability of a magnetic field to affect the magnetic part of a solid material's entropy to reduce it and, therefore, increase the lattice (vibrational) part of the entropy and the temperature of the solid material in an adiabatic process. When the magnetic field is removed, the change or return of the magnetic entropy of the magnetic solid material reduces the temperature of the material. Thus, magnetic refrigeration is effected by cyclic heat dissipation and heat absorption in the course of adiabatic magnetization and adiabatic demagnetization of the magnetic solid material via application/discontinuance of an external magnetic field. A refrigeration apparatus that exhausts or vents the released heat on one side of the apparatus when the magnetic solid material is magnetized and cools a useful load on another side when the magnetic solid material is demagnetized is known in the magnetic refrigeration art as an active magnetic regenerator magnetic refrigerator (also known by the acronym AMR/MR).

U.S. Pat. No. 5,743,095 describes active magnetic refrigerant materials having general molecular formula $Gd_5(Si_xGe_{1-x})_4$ that provide a giant magnetocaloric effect for use in magnetic refrigerators when $0 \leq x \leq 0.5$. Also as described in that patent are alloys for $0.5 < x \leq 1.0$ which order magnetically between 295 and 335 K and have useful and large (but not giant) magnetocaloric properties. The giant magnetocaloric effect in the former alloys ($x \leq 0.5$) is due to a first order magnetic/structural transition,[1] and thus these alloys are useful for cooling applications from just below room temperature (295 K) down to liquid hydrogen temperatures (20 K). The large magnetocaloric effect in the latter alloys ($x > 0.5$) is due to a second order magnetic transformation, making these alloys useful magnetic refrigerants for the high temperature layer of a multilayered active magnetic regenerator of a cooling device for the rejection of heat to the ambient, and also for heat pumps to reach ~350 K. The upper temperature limit can be increased from 295 K to 300 K by providing $x=0.525$ and heat treatment pursuant to this invention as described below such that x values of $0.525 \leq x \leq 1.0$ provide a large magnetocaloric effect material.

For most magnetic refrigeration and heat pump applications, large amounts (e.g. several hundred grams to hundreds of kilograms) of the magnetocaloric materials per device are needed to obtain sufficient cooling. For example, for a highly efficient magnetic air conditioner about 0.5 kg of magnetic refrigerant could provide a cooling power of 1 kW (kilowatt). Since a typical home requires about 5 kW of cooling power, about 2.5 kg of magnetic refrigerant are needed. For less efficient devices, more magnetic refrigerant material is required. The current process for making the giant and the large magnetocaloric materials $Gd_5(Si_xGe_{1-x})_4$ involves arc-melting the appropriate amounts of the individual elements (Gd, Si, and Ge), but this technique normally is limited to 50 to 100 gram quantities. Larger quantities can be prepared by arc-melting but generally the resulting ingots are inhomogeneous; i.e. parts of the ingot have excellent magnetocaloric properties much greater than other parts of the ingot having lower magnetocaloric properties, which at best are about the same as the current prototype magnetic refrigerant, Gd, for near room temperature applications. The ingot inhomogeneity is readily understood since, for the $Gd_5(Si_xGe_{1-x})_4$ alloys, the exact Gd to (Si+Ge) ratio 5:4 has been found to be critical. For example, small deviations from the 5:4 ratio have been found to lead to the appearance of the $Gd(Si_xGe_{1-x})$, 1:1, or $Gd_5(Si_xGe_{1-x})_3$, 5:3, phases, and therefore, to significantly reduced magnetic refrigerant capacity.

These very same alloys, which exhibit the giant magnetocaloric effect, also exhibit an extremely large magnetostriction and also a large magnetoresistance when undergoing the first order transformation. Based on crystallographic data, $Gd_5(Si_2Ge_2)$ has a reversible linear colossal magnetostriction of ~10,000 parts per million (ppm) along the [100] axis, or a volumetric colossal magnetostriction of ~4500 ppm. In comparison, the magnetostriction of Terfenol-D [$(Tb_{0.7}Dy_{0.3})Fe_2$] is ~1200 ppm. Since the colossal magnetostriction is due to the first order phase transition it is expected to occur in all $Gd_5(Si_xGe_{1-x})_4$ alloys for $0 \leq x \leq 0.525$. Thus the method of this invention described herein for the production of the giant magnetocaloric materials also applies for producing the colossal magnetostrictive alloys, which are useful as actuators, positioning devices, etc. controlled by the change of the magnetic field and also for magnetoelastic sensors to detect stresses.

Measurements of the electrical resistance of $Gd_5(Si_xGe_{1-x})_4$ alloys for $0.24 \leq x \leq 0.525$ as a function of temperature and magnetic field show that there is a large (~25%) change in the magnetoresistance at the first order phase transformation when induced by a magnetic field above their respective ordering temperatures. The sign of the change is positive for $x=0.375$ and negative for $x=0.5$. Such large changes have been observed in artificial, non-rare earth, magnetic multilayered materials, and have been labeled as "giant" magnetoresistors. There are a number of applications in the electronics field for giant magnetoresistance materials, including read heads in magnetic recording devices and sensors.

Furthermore, the Si to Ge ratio is also important since the magnetic ordering (Curie) temperature ($T_C$) is strongly dependent on the relative amounts of these two elements. For example, for x greater than 0.525 for the $Gd_5(Si_xGe_{1-x})_4$ material, the giant magnetocaloric, colossal magnetostriction, and giant magnetoresistance effects are not observed; and for x greater than or equal to 0 and less than or equal to 0.525, the Curie temperature varies almost linearly with x from approximately 20 K at x=0 to approximately 300 K at x=0.525, and the material exhibits the giant magnetocaloric, colossal magentostrictive, and giant magnetoresistance effects.

Arc-melting 100 gram quantities at a time is labor intensive and thus an extremely expensive operation. Furthermore, use of commercially pure Gd (having more than 0.1 wt. % interstitial and other impurities) instead of high purity Gd (less than 0.1 wt. % impurities) to prepare the $Gd_5(Si_xGe_{1-x})_4$ material for $0 \leq x \leq 0.525$ by arc-melting has led to only average magnetocaloric properties and not the giant magnetocaloric properties desired. The magnetocaloric properties of $Gd_5(Si_xGe_{1-x})_4$ for $0.525 \leq x \leq 1.0$, however, are not nearly as sensitive to the impurities in the Gd metal used to prepare the alloys by arc-melting. Thus there is a need for a method of producing relatively larger quantities of the $Gd_5(Si_xGe_{1-x})_4$ material for $0 \leq x \leq 1.0$ using commercially pure Gd, Si and Ge as starting charge components in a more cost effective manner.

An object of the present invention is to satisfy this need.

SUMMARY OF THE INVENTION

The present invention provides a method of making an active magnetic refrigerant, colossal magnetostrictive and giant magnetoresistive material using commercially pure rare earth, Si, and Ge as charge components by vacuum melting in a manner that enables production of relatively large amounts of the material, despite the commercially available rare earth charge component having relatively high levels of certain interstitial impurities, especially carbon impurity.

In one embodiment of the invention, the method is used to produce $Gd_5(Si_xGe_{1-x})_4$ material where $0 \leq x \leq 0.525$ exhibiting the giant magnetocaloric effect. In another embodiment of the invention, the method is used to produce $Gd_5(Si_xGe_{1-x})_4$ material where $0.525 < x \leq 1.0$ exhibiting a large, but not giant, magnetocaloric effect.

In another embodiment of the invention, the method is used to produce magnetic materials having colossal magnetostrictive and giant magnetoresistive properties. For example, the $Gd_5(Si_xGe_{1-x})_4$ material where $0 \leq x \leq 0.525$ can be made pursuant to a method of invention.

Also, other magnetic materials including but not limited to, $R_5(Si_xGe_{1-x})_4$ and $(R_{1-y}R^1{}_y)_5(Si_xGe_{1-x})4$ materials where elements or combination of rare earth elements can be produced having giant magnetocaloric, colossal magnetostrictive, and giant magnetoresistive properties.

Heat treated magnetic refrigerant materials comprising $Gd_5(Si_xGe_{1-x})_4$ material where $0 \leq x \leq 0.525$ are provided having increased magnetocaloric properties by virtue of the heat treatment. The heat treatment can be conducted in a crucible in which the material has solidified. For example, heat treated magnetic refrigerant material comprising $Gd_5(Si_xGe_{1-x})_4$ material where $0 \leq x \leq 0.525$ is provided having at least a magnetic entropy change of 16 J/kg K.

The invention also envisions a multi-stage magnetic refrigerator or multi-layer regenerator bed having a relatively high temperature stage or layer comprising $Gd_5(Si_xGe_{1-x})_4$ material where x is selected between 0 and 1 and having a second relatively lower temperature stage comprising a material with a different value of x selected between 0 and 1. The value of x for the high temperature stage (or layer) is larger than the x value for the low temperature stage (or layer).

An illustrative embodiment of the invention for making $Gd_5(Si_xGe_{1-x})_4$ where $0 \leq x \leq 0.525$ involves placing stoichiometric amounts of commercially pure Gd, Si, and Ge as individual distinct charge components in a crucible, such as for example a refractory metal crucible, taking into consideration loss of charge components during melting. For example, excess Si (or Ge) may be provided to accommodate losses of Si (or Ge) during melting and heat treatment. The Gd charge component may include a relatively high C impurity content from about 0.03 to 1 atomic % as well as other impurities. The crucible charge components are heated by energization of an induction coil about the crucible to a melting temperature (e.g. about 1800 degrees C.) under vacuum (subambient pressure) at a rate that permits the alloy components to out-gas and controlling power to the induction coil when temperature of the crucible contents rises during heating due to one or more exothermic reactions between/among the alloy components. The melting temperature is held for a time sufficient to homogenize the alloy chemistry, oxidize the carbon present with oxygen in the starting Gd charge component, and prevent excessive reaction of the Si component with the refractory metal crucible. Then, the power to the induction coil is terminated to permit rapid solidification of the alloy in the crucible to avoid phase segregation. Preferably, cooling is at a rate of between 360 to 60 degrees C./minute depending upon the mass of the material to avoid phase segregation.

When the temperature of the alloy falls below the melting temperature, power is supplied to the induction coil to heat the solidified alloy at a temperature for a time (e.g. 1400 degrees C. plus or minus 10 degrees C. for 1 to 10 hours) effective to homogenize the microstructure thereof and impart enhanced magnetocaloric properties to the solidified alloy. The power to the induction coil then is terminated to allow the heat treated alloy to cool as rapidly as possible to ambient temperature to avoid eutectoid decomposition. In lieu of the in-crucible heat treatment, the solidified alloy can be removed from the crucible and heat treated in a heat treatment furnace to this same end by holding the alloys at any number of selected temperatures between 900 degrees C. and 1700 degrees C. for an appropriate length of time depending upon the temperature. For example, at 900 degrees C. the alloy should be held for 1 to 3 days, but as the heat treating temperature is increased the holding time is lowered down to one hour at 1700 degrees C. After the alloy has been heat treated at the desired temperature for the minimum holding period the alloy is cooled as rapidly as possible to ambient temperature.

The above heat treatment produces a heat treated magnetic refrigerant material that exhibits extraordinary magnetothermal properties, such as a heretofore undiscovered giant magnetocaloric effect (magnetic entropy change) based on a reversible structural magnetic and/or a reversible ferromagnetic/antiferromagnetic first order phase transition upon heating, providing a sharp reduction in magnetization near the magnetic ordering temperature (Curie temperature). For example, the heat treated alloy refrigerant exhibits a magnetic entropy change that is about 50% greater than that exhibited by the same alloy material arc-melted pursuant to U.S. Pat. No. 5,743,095.

The aforementioned objects and advantages of the present invention will become more readily apparent from the following detailed description taken with the following drawings.

DESCRIPTION OF THE DRAWINGS

FIG. 3A shows a flat piece of Ta covering the entire opening of the crucible; FIG. 3B shows an inverted, slightly larger crucible covering the opening; and FIG. 3C shows a welded-shut crucible.

DETAILED DESCRIPTION OF THE INVENTION

Figure 1:
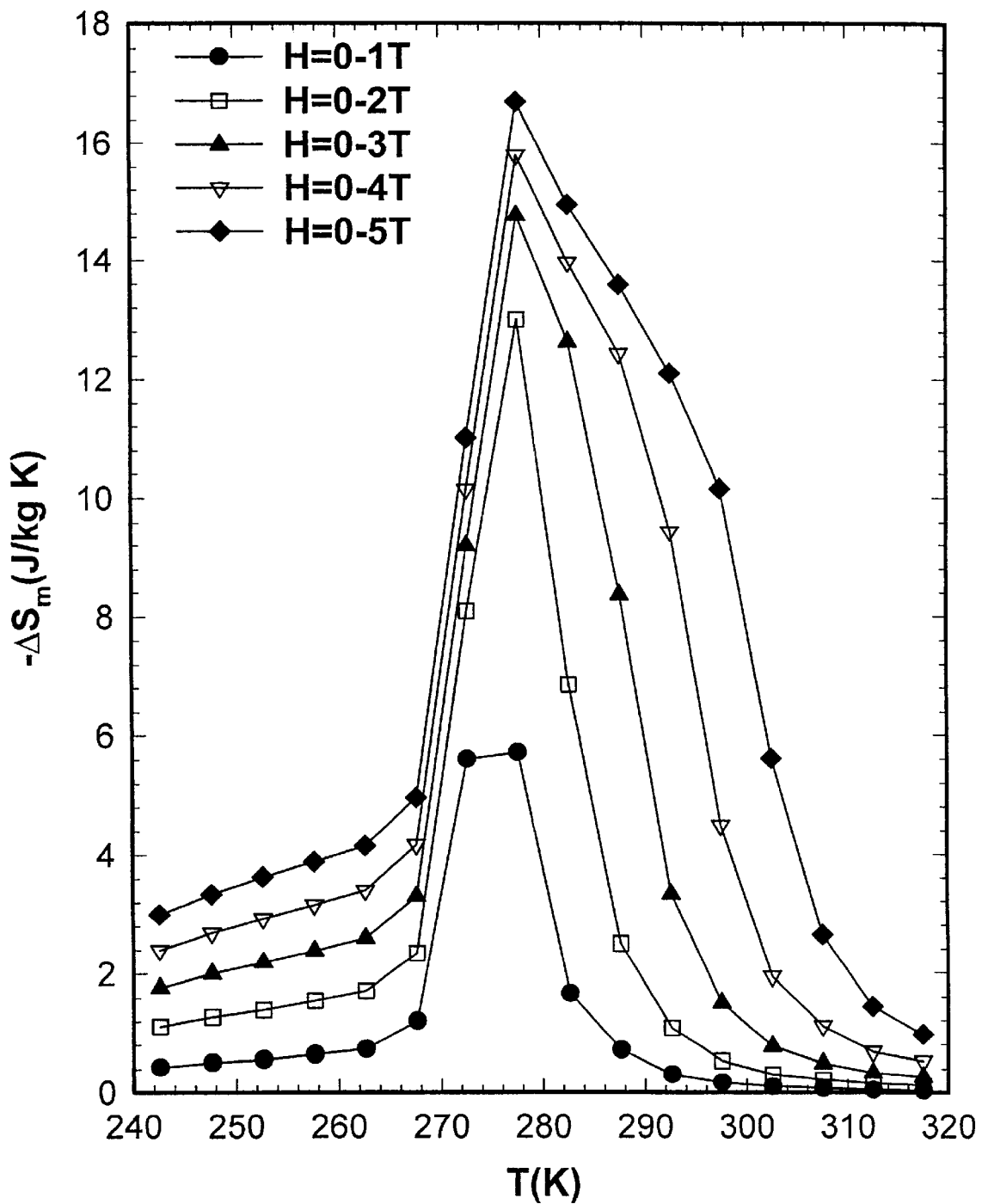
FIG. 1 illustrates the magnetocaloric effect (MCE) properties of $Gd_5(Si_2Ge_2)$ prepared by induction melting commercially available Gd plus Si and Ge in a Ta crucible pursuant to the invention.

The present invention provides in one embodiment a method of making active magnetic refrigerant materials represented by $Gd_5(Si_xGe_{1-x})_4$ production of relatively large amounts of the material.

Although the invention is described below with respect to making the $Gd_5(Si_xGe_{1-x})_4$ material where $0 \leq x \leq 1.0$, the invention can be used to make other materials including, but not limited to, the $R_5(Si_xGe_{1-x})_4$ material where $0 \leq x \leq 1.0$ and the $(R_{1-y}R^1_y)_5(Si_xGe_{1-x})_4$ materials where $0 \leq y < 1.0$ and $0 \leq x \leq 1.0$ and R and R' are rare earth elements or combination thereof, where the rare earth, R and R', is selected from the group consisting of Gd, Sc, Y, La, Ce, Pr, Nd, Sm, Eu, Tb, Dy, Ho, Er, Tm, Yb, and Lu, and where the R, R' rare earth commercially pure charge component(s) has a relatively high content of carbon impurity, such as about 0.03 atomic % C and above (e.g. about 0.03 to 1 atomic % C impurity). The materials can also be made as colossal magnetostrictive and giant magnetoresistive materials. Examples of such other $R_5(Si_xGe_{1-x})_4$ alloys include, but are not limited to, $Gd_5(Si_2Ge_2)$, $Tb_5(Si_2Ge_2)$, and $Dy_5(SiGe_3)$. Examples of such other $(R_{1-y}R^1_y)_5(Si_xGe_{1-x})_4$ alloys include, but are not limited to, $(Gd_{0.8}Tb_{0.2})_5(Si_2Ge_2)$, $(Gd_{0.9}Dy_{0.1})_5(Si_2Ge_2)$, $(Gd_{3.8}Dy_{1.2})Si_4$ and $(Gd_{4.2}Er_{0.8})Si_4$.

Crucible Materials

At the beginning of the development of a method to make $Gd_5(Si_xGe_{1-x})_4$ where $0 \leq x \leq 1.0$ material pursuant to the invention, only the crystallographic, magnetic and heat capacity (and derived thermodynamic) properties of the material were known based on the inventors' prior research,[1-5] although some evidence existed in the literature[6] that the compounds melt above 1600 degrees C., but no specific melting points were reported. After a series of experiments the inventors found that $Gd_5(Si_2Ge_2)$ melts at 1750±25 degrees C. This work was followed by tests to check the compatibility of molten $Gd_5(Si_2Ge_2)$ with various refractory materials $Y_2O_3$-stabilized-zirconia ($ZrO_2$), alumina ($Al_2O_3$), boron nitride (BN), and the refractory metals Ta, W, Mo, and Nb at ~1800 degrees C. Of these materials Ta and W did not appear to react with the molten $Gd_5(Si_2Ge_2)$, at least when the time at ~1800 degrees C. in a vacuum of $10^{-6}$ torr was less than 15 minutes, and thus could be used as crucible materials for preparing this family of alloys. The stabilized-$ZrO_2$ was slowly attacked by liquid $Gd_5(Si_2Ge_2)$ while holding for 15 minutes at 1800 degrees C. The low density $Al_2O_3$ was essentially dissolved in liquid $Gd_5(Si_2Ge_2)$ while holding at 1800 degrees C. for 15 minutes. The BN crucible was wet by the molten $Gd_5(Si_2Ge_2)$ when held at 1800 degrees C. for 15 minutes. No reaction was evident, but since the BN was wet by $Gd_5(Si_2Ge_2)$ it was difficult to separate the two materials without significant loss of the $Gd_5(Si_2Ge_2)$ material. Furthermore, the relatively expensive BN crucible could not be reused. Both Mo and Nb reacted with molten $Gd_5(Si_2Ge_2)$ when held for 15 minutes at 1800 degrees C. Thus, of the seven refractory materials tested, only Ta and W would serve as a crucible for melting the $Gd_5(Si_xGe_{1-x})_4$ family of alloys and possibly for preparing the alloys by direct combination of the three alloy components Gd, Si, and Ge (see below). Because W is more difficult to fabricate and is more brittle than Ta, the use of Ta as the crucible material was further tested. Tantalum was further tested as a crucible material by melting $Gd_5(Si_2Ge_2)$ for 25 minutes at 1800 degrees C. at $10^{-6}$ torr and also at 1900 degrees C. for 15 minutes at $10^{-6}$ torr. In both cases there was no evidence of any reaction between the two materials, and the alloy could easily be broken out of the crucible since the $Gd_5(Si_2Ge_2)$ is quite brittle. Furthermore, since the Ta is sufficiently ductile the crucibles could be reused for several more melts.

Commercially pure elements Gd, Si, and Ge were reacted in a Ta crucible to form $Gd_5(Si_2Ge_2)$. Commercially available chunks of Gd, Si, and Ge were used although pellets, powders, and other forms of these charge components can be used. The Gd chunks were placed in the bottom of the crucible with the Ge and Si chunks on top, and then the crucible and contents were heated up slowly in an induction furnace under a high vacuum ($10^{-6}$ torr) to melt the Ge (938 degrees C.) which reacted with the Gd to form a $GdGe_x$ alloy. A graphite felt radiation shield sleeve was disposed about the induction coil. Purity of the commercially pure Gd was 98.1 at. % (99.8 wt. %); that of the commercially pure Ge was 99.99 at. %; and that of the commercially pure Si was 99.99 at. % where at. % is atomic % and wt. % is weight %. Generally the heat of reaction of the formation of $GdGe_x$ was large enough to raise the temperature so the Si melts (1414 degrees C.) and reacts with the $GdGe_x$ phase, which results in another temperature excursion which may be high enough to melt the entire mixture. If not, the power to the induction furnace was increased to heat the charge to 1800 degrees C. and hold for 1 hour to homogenize the melt.

When large quantities >200 g (grams) of the alloy were prepared by direct reaction of the three components, it was found that because of the large heat of formation of the $Gd_5(Si_xGe_{1-x})_4$ alloy, this will lead to an excessive heat excursion and the molten Gd metal at the bottom of the crucible is in contact with the Ta for a sufficiently long time to dissolve some of the Ta before the molten Gd reacts to form the $Gd_5(Si_xGe_{1-x})_4$ alloy. The solubility of Ta in molten Gd varies from 0.07 at. % at 1381 degrees C. to 0.34 at. % at 1772 degrees C[7] and this may be sufficient to open pin holes in the Ta crucible, especially at the welded interfaces of the crucible bottom where it is attached to the crucible walls, allowing the molten alloy to leak out of the crucible. To overcome possible melting of the Ta crucible, a small amount of crushed $Gd_5(Si_2Ge_2)$, which had been prepared earlier, was placed on and covered the bottom of the crucible. Thus when the Gd melts it dissolves and/or reacts with the $Gd_5(Si_2Ge_2)$ and never reaches the crucible bottom or walls as pure Gd.

The Carbon Effect

Figure 2:
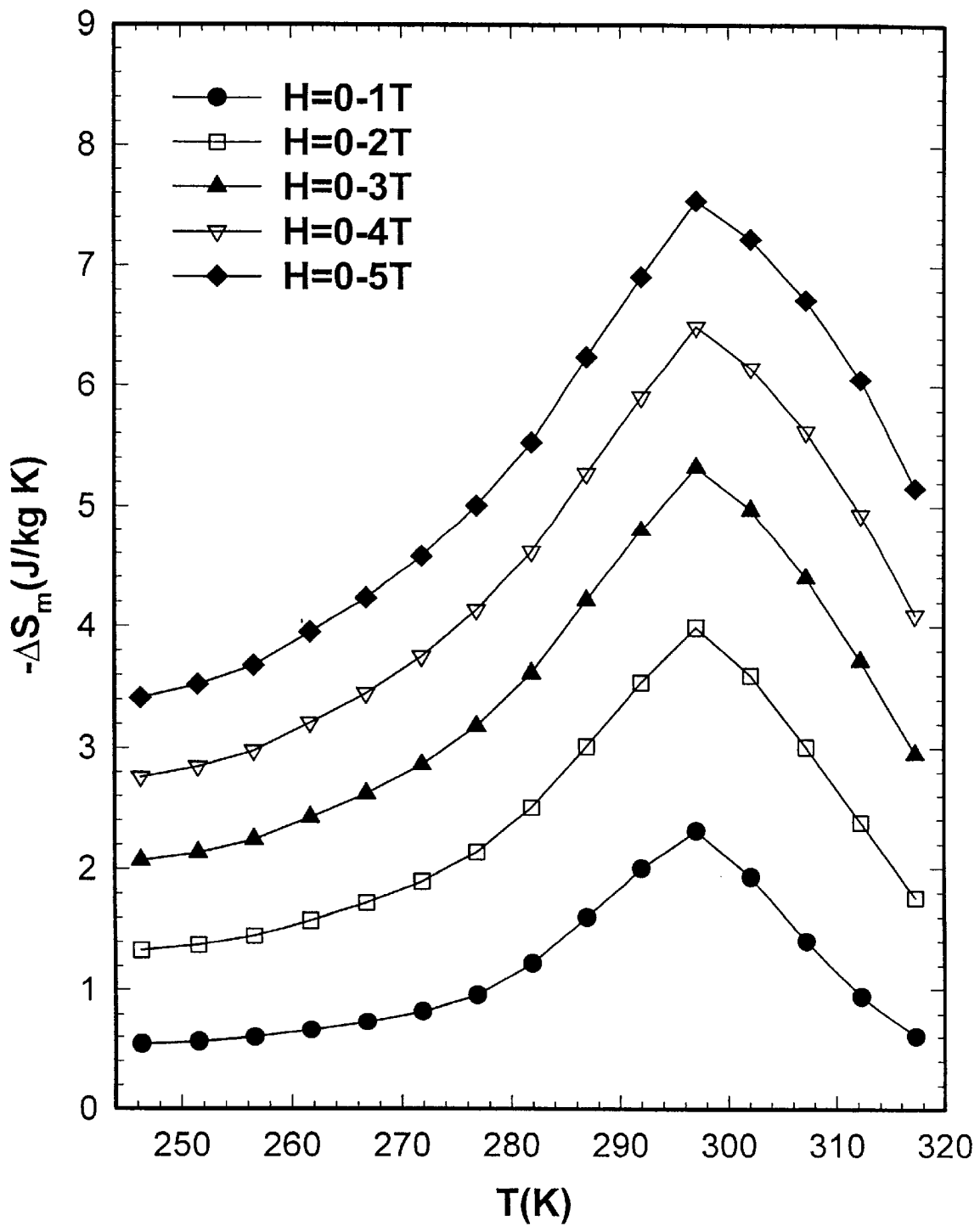
FIG. 2 illustrates the magnetocaloric effect (MCE) properties of $Gd_5(Si_2Ge_2)$ prepared by arc-melting commercially available Gd plus Si and Ge.

The inventors compared the magnetocaloric effect (MCE) properties of $Gd_5(Si_2Ge_2)$ prepared by the reaction of the induction melted three alloy components pursuant to the invention in a Ta crucible with those of an arc-melted button sample. The inventors found that $-\Delta S_m$ (MCE) value of the sample prepared in the Ta crucible was 17 J/kg K (FIG. 1) compared to 7 J/kg K (FIG. 2) for the arc-melted sample. Both samples were prepared from the same commercial Gd stock, which had a carbon content of 327 wt. ppm (0.43 at. %) and an oxygen content of 0.186 wt. % (1.85 at. %), where wt. ppm means parts per million by weight. The induction melted sample was prepared by heating Gd, Si, and Ge to a temperature of 1800° C. in vacuum, holding for about 60 minutes before cooling directly to room temperature without an intermediate anneal. The arc-melted sample was prepared by melting Gd, Si, and Ge under 1 atmosphere of He in an electrically generated arc on a water cooled Cu hearth, and was remelted six times, turning over the metal button between melts to insure homogeneity. The former $\Delta S_m$ value is about the same as reported in inventors' original paper announcing the discovery of the giant magnetocaloric materials[4] (the Gd used in that study[4] was obtained from the Ames Laboratory, Materials Preparation Center, Ames, Iowa, and had significantly lower C and O contents, such lower C, O material being referred to herein as AL material).

An exemplary Gd material available from Ames Laboratory typically exhibits a C of about 236 ppm atomic, N of about 11 ppm atomic, O of about 472 ppm atomic, and F of less than about 25 ppm atomic.

In contrast, commercially pure Gd generally comprises at least about 90 atomic % Gd, about 0.03 to about 1 atomic % C, about 0.10 to about 4 atomic % O, about 0.01 to about 1 atomic % N, and about 0.001 to about 1 atomic % all other impurities, where other impurities include Cl, F, Na, Mg, Al, Si, Ca, Ti, Fe, Ni, Y, and Ta. A typical range of impurities in commercially pure Gd are 900–2950 ppm atomic C, 270–460 ppm atomic N, 12,800–26,500 ppm atomic O, and 4–2090 ppm atomic F.

Figure 3:
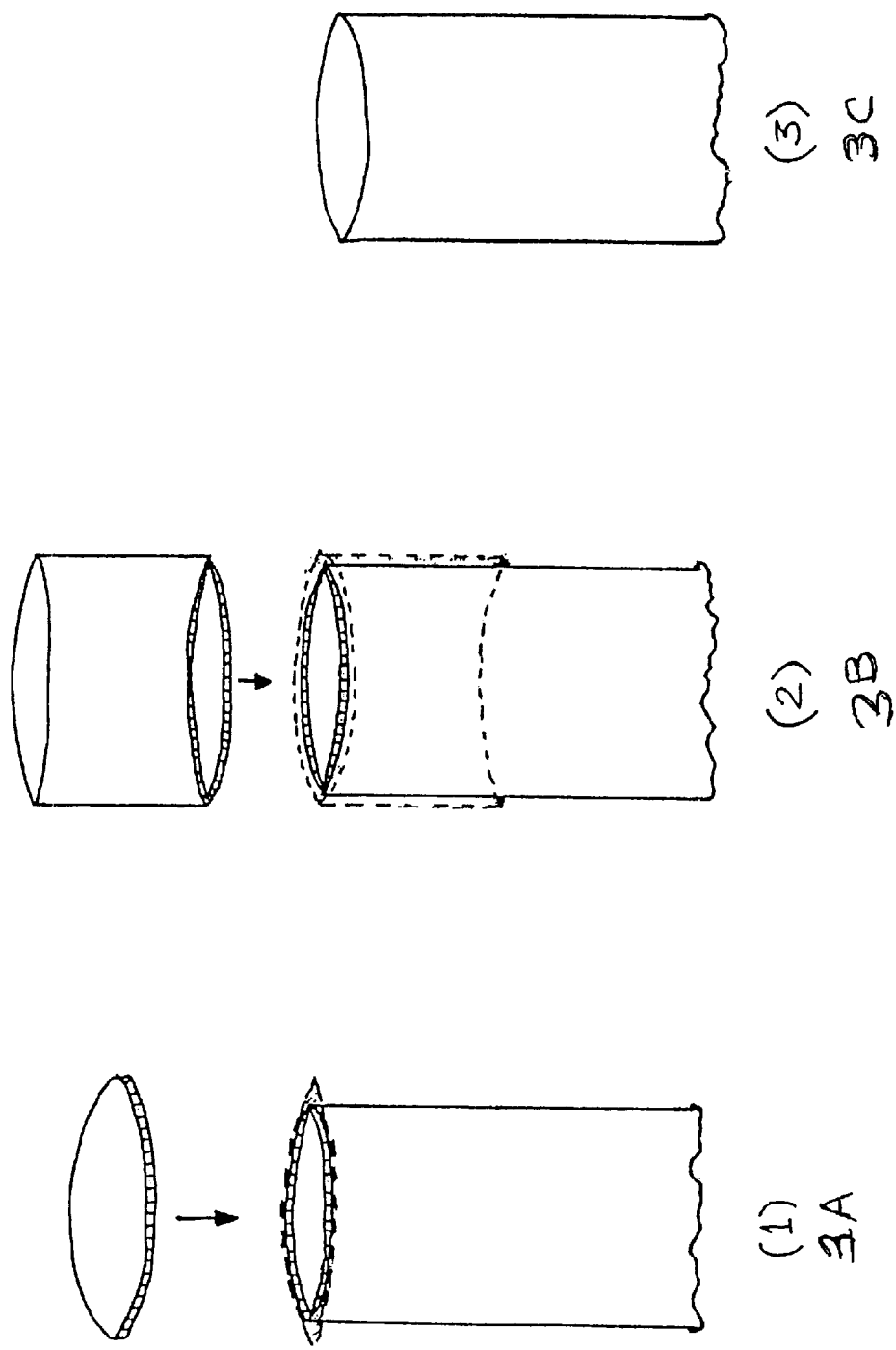
FIG. 3 is a schematic view of Ta crucibles used for the preparation of $Gd_5(Si_2Ge_2)$ by induction melting with different covers over the crucible.
Figure 4:
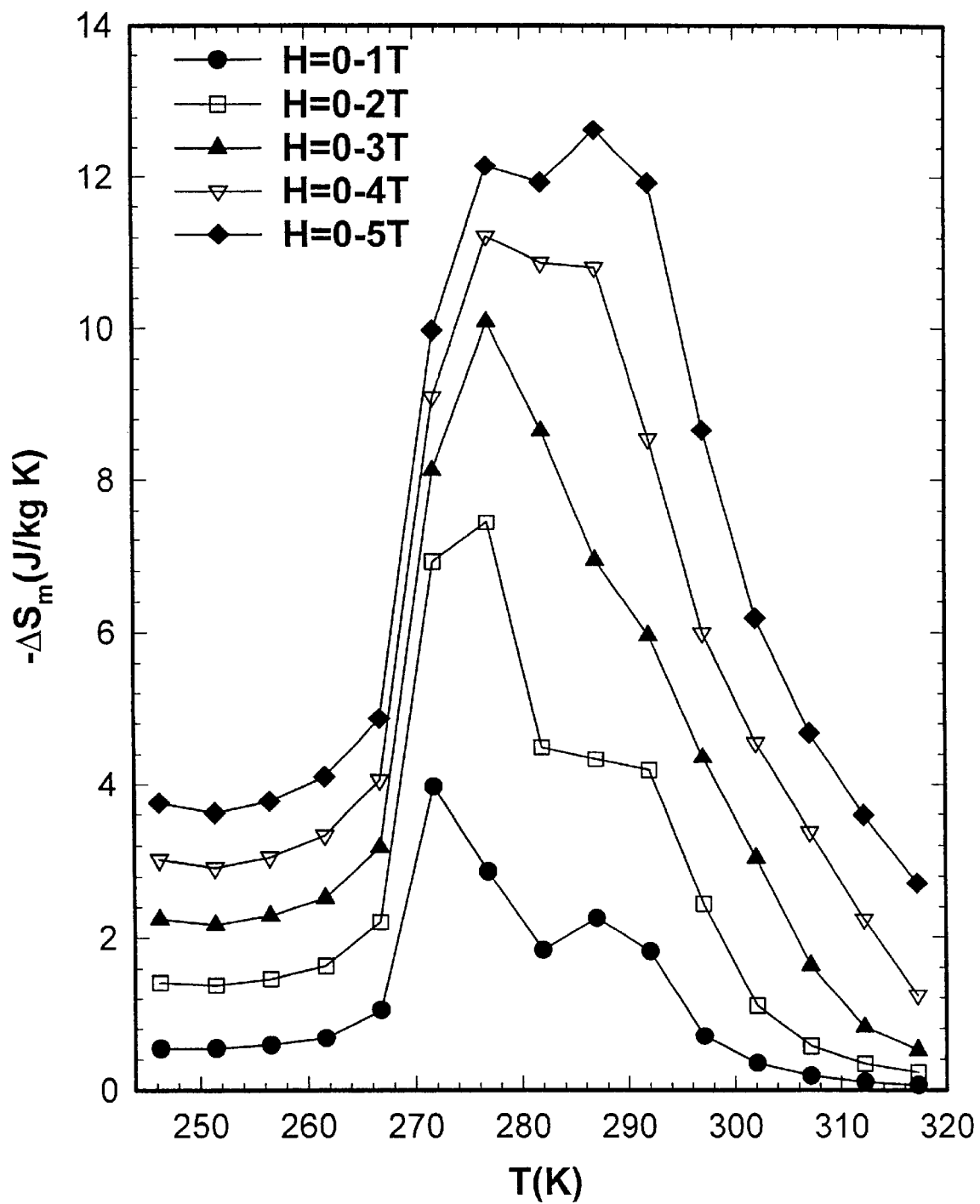
FIG. 4 illustrates the magnetocaloric effect calculated from magnetization measurements of $Gd_5(Si_2Ge_2)$ prepared by induction melting commercial Gd plus Si and Ge pursuant to the invention in a Ta crucible with a flat sheet of Ta covering the crucible.
Figure 6:
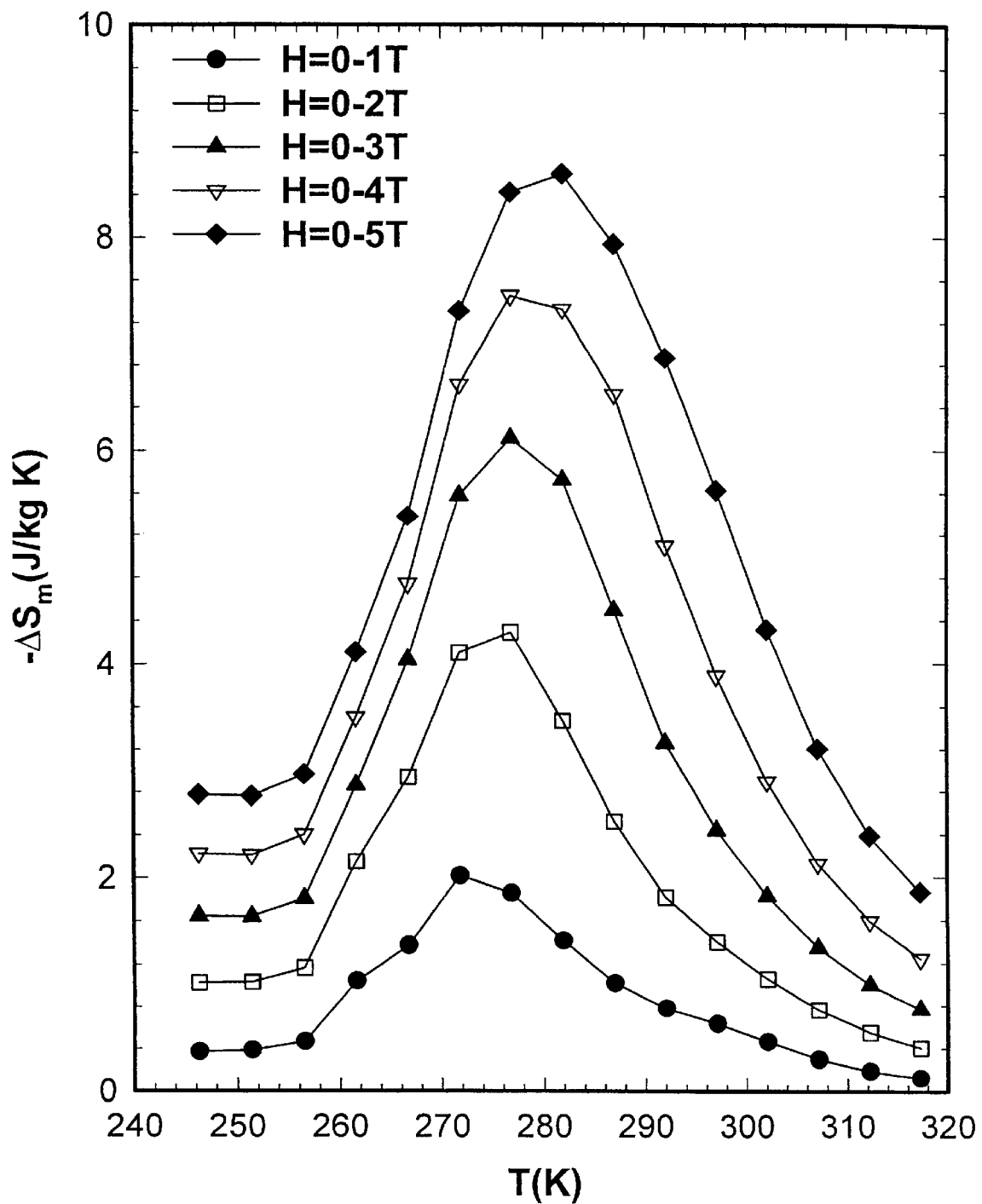
FIG. 6 illustrates the magnetocaloric effect calculated from magnetization measurements of $Gd_5(Si_2Ge_2)$ prepared by induction melting commercial Gd plus Si and Ge pursuant to the invention in a Ta welded-shut crucible.
Figure 7:
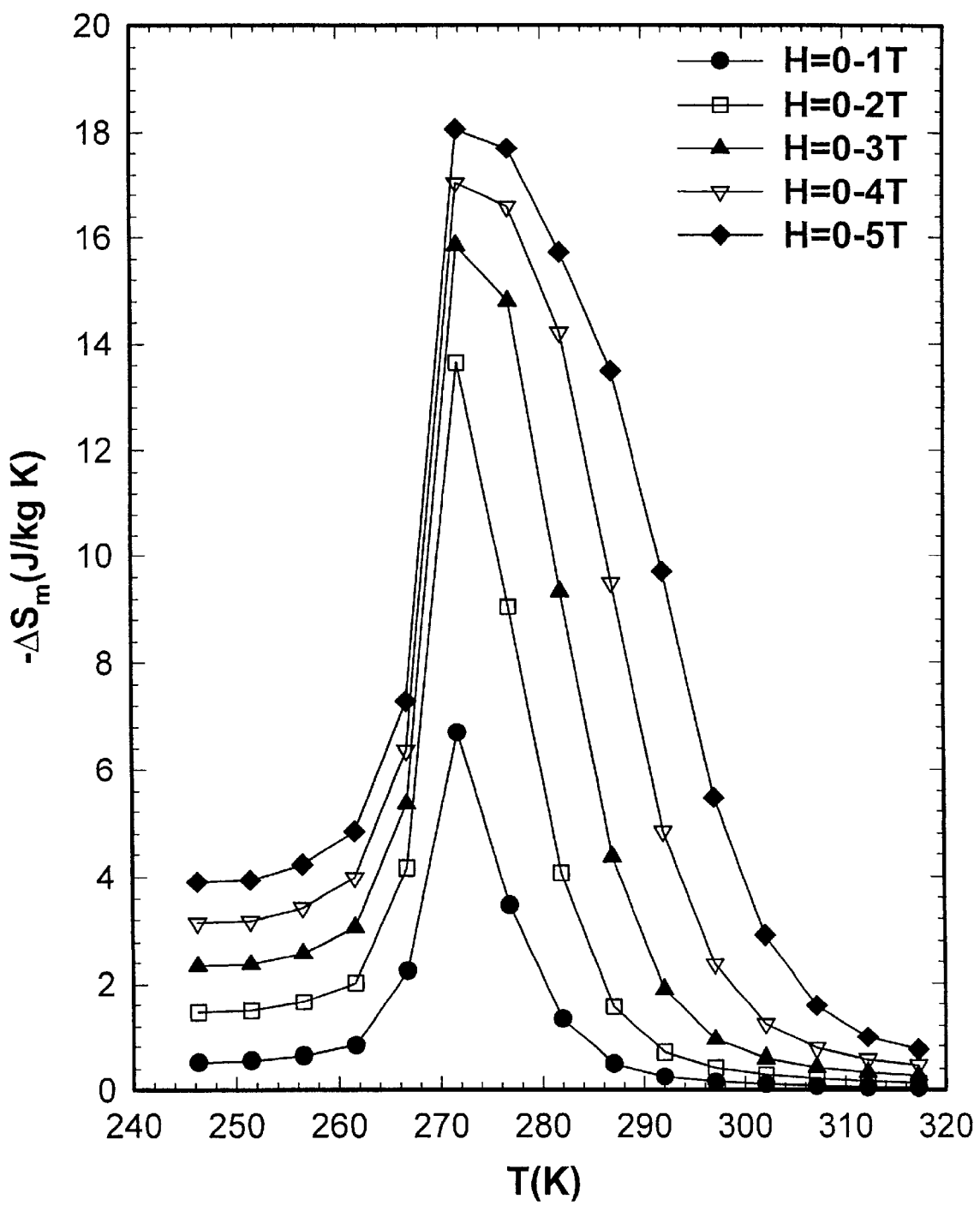
FIG. 7 illustrates the magnetocaloric effect (MCE) properties of $Gd_5(Si_2Ge_2)$ prepared by induction melting commercially available Gd plus Si and Ge pursuant to the invention in a Ta crucible held molten at 1800 degrees C. for 1 hour.
Figure 8:
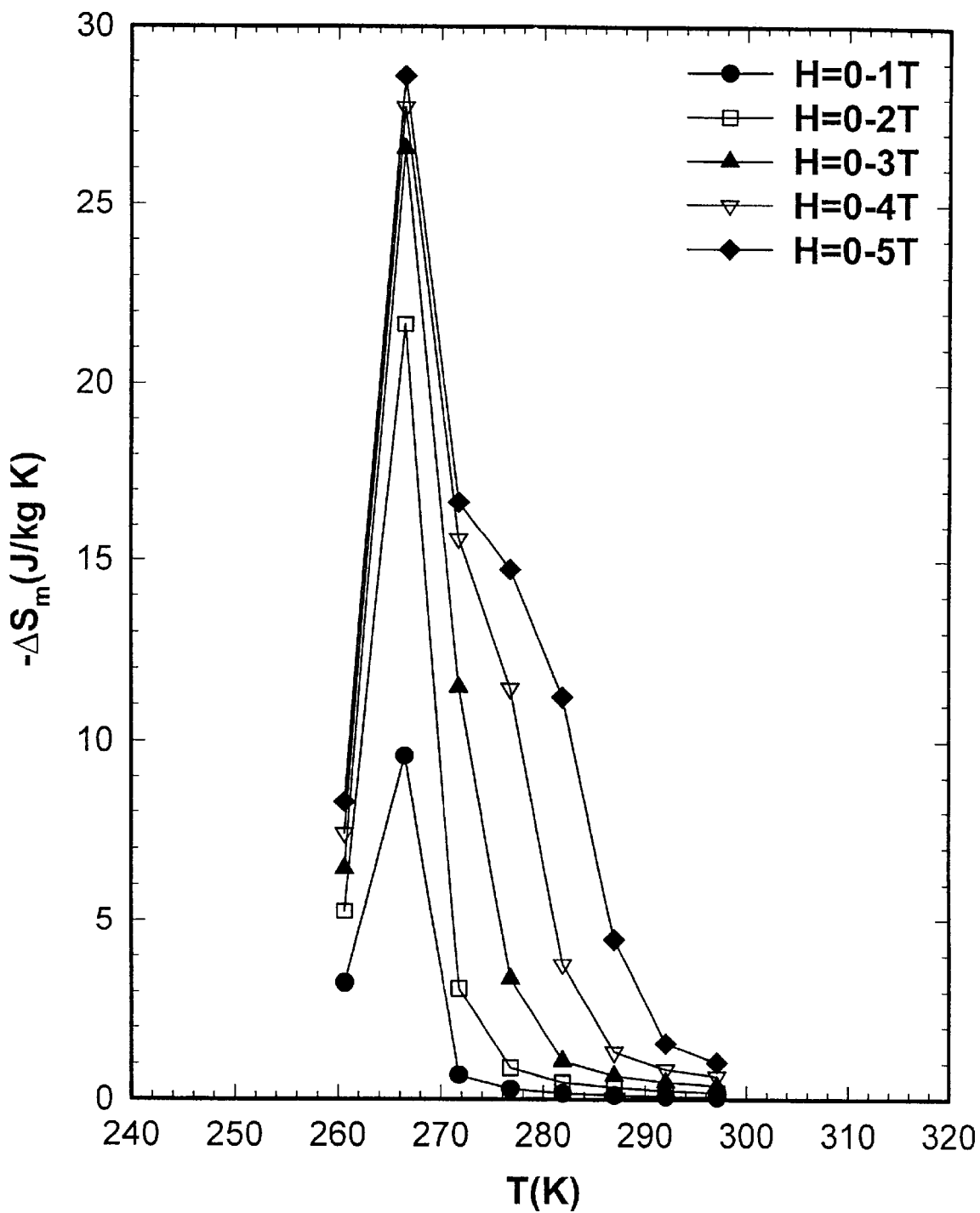
FIG. 8 illustrates the magnetocaloric effect (MCE) properties of $Gd_5(Si_2Ge_2)$ prepared by induction melting commercially available Gd plus Si and Ge pursuant to the invention in a Ta crucible held molten at 1800 degrees C. for 1 hour and heat treated at 1600 degrees C. for 1 hour after rapid solidification.

It would appear that the C and O in the molten $Gd_5(Si_2Ge_2)$ alloy, which is held for 1 hour at 1800 degrees C. at ~$10^{-6}$ torr, react to form CO or $CO_2$ which are pumped-off in the dynamic vacuum of ~$10^{-6}$ torr. The C and O reaction appears unlikely to occur in the molten arc-melted button, since the time is so short (a few minutes) and since arc-melting is carried out in a helium (or argon) atmosphere very little C and O is removed during the arc-melting process. Experiments were conducted to evaluate the detrimental effect of carbon on the giant MCE as indicated from a study of the effect of alloying additions[5] For example, three samples, which were prepared by melting in Ta crucibles with different covers over the crucible, were heated together simultaneously in the induction furnace and held in the molten state for 15 minutes at 1800 degrees C. at $10^{-6}$ torr. The three cover arrangements were as follows: (1) a flat piece of Ta covering the entire opening of the crucible, FIG. 3 A; (2) an inverted, slightly larger crucible covering the opening, FIG. 3B; and (3) a welded-shut crucible, FIG. 3C. After the melting operation the samples were cooled down and it was noted that the welded-shut crucible was bowed outward, indicating that a gas pressure had built up inside the crucible during the heating operation. The magnetization measurements of the three $Gd_5(Si_2Ge_2)$ samples made in these crucibles gave maximum $-\Delta S_m$ values of 12 to 13 J/kg K and two peaks (magnetic ordering temperatures) of 277 and 287 K for the first cover arrangement (FIG. 4); $-\Delta S_m=13$ and 5 J/Kg K at 257 and 297 K, respectively for the inverted crucible arrangement (FIG. 5); and a $-\Delta S_m=8$ J/kg K and a single peak at 278 K for the sealed crucible (FIG. 6). These $-\Delta S_m$ values indicate that the C remained in the $Gd_5(Si_2Ge_2)$ alloy which was melted in the welded-shut Ta crucible, and that $-\Delta S_m$ was essentially the same as for the arc-melted button (see above). Chemical analysis of the arc-melted button indicate that this sample contained 318 wt. ppm (0.42 at. %) C, which is essentially the same as that of the commercial starting Gd metal [327 wt. ppm (0.43 at. %) C]. Furthermore, the C content of a $Gd_5(Si_2Ge_2)$ sample held molten at 1800 degrees C. for 1 hour in a Ta crucible at $10^{-6}$ torr with a loose-fitting lid was 109 wt. ppm (0.14 at. %), and its maximum $-\Delta S_m$ value was 18 J/kg K (FIG. 7). Additional confirmation was obtained from another $Gd_5(Si_2Ge_2)$ sample melted in a Ta crucible with a flat lid, FIG. 3A at 1800 degrees C. for 1 hour and heat treated at 1600 degrees C. for one hour after rapid solidification, which was obtained by shutting of the power to the induction furnace. The maximum $-\Delta S_m$ value and magnetic ordering temperature was 28 J/kg K and 267 K, respectively (FIG. 8). Furthermore, a comparison of the chemical analyses of the Gd starting material and the last-made $Gd_5(Si_2Ge_2)$ alloy, see Table 1, shows that there is a reduction in both C and O by 0.26 and 0.41 at. %, respectively. This suggests that the C is lost as a mixture of CO (>55%) and $CO_2$ (<45%), assuming that the reduction of the amount of O is due entirely to the C oxidation process.

TABLE 1

Chemical Analysis Of The Commercial Gadolinium Starting Material and of a Melted in Ta Crucible, Rapidly Quenched, Heat Treated $Gd_5(Si_2Ge_2)$ Sample (All Values Reported in Atomic Percent)

| Impurity | Gadolinium | $Gd_5(Si_2Ge_2)$ |
| --- | --- | --- |
| C | 0.43 | 0.17 |
| N | 0.43 | 0.28 |
| O | 1.83 | 1.42 |
| F | 0.37 | 0.17 |

Segregation Effect

Figure 5:
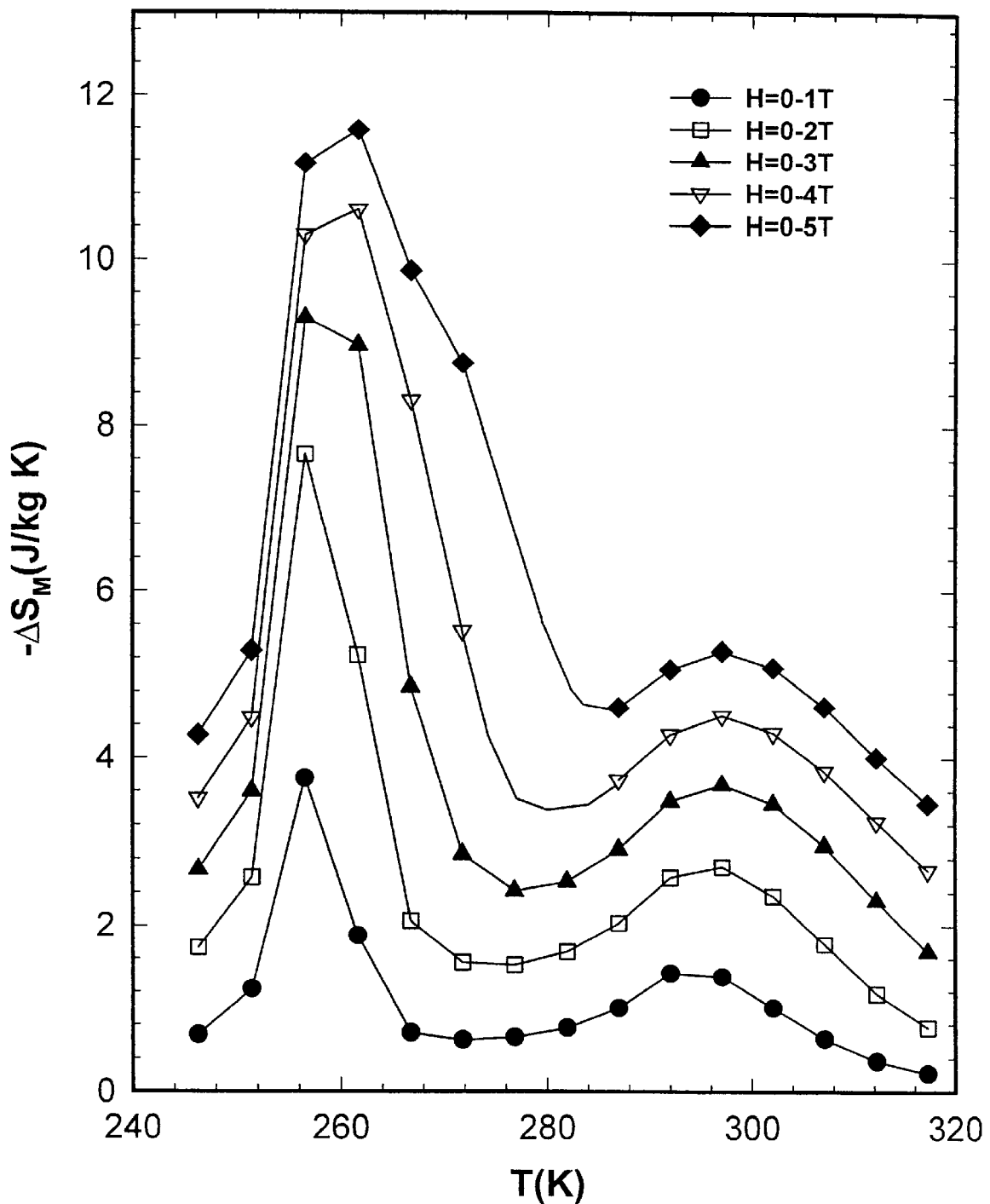
FIG. 5 illustrates the magnetocaloric effect calculated from magnetization measurements of $Gd_5(Si_2Ge_2)$ prepared by induction melting commercial Gd plus Si and Ge pursuant to the invention in a Ta crucible covered by an inverted, slightly larger Ta crucible.

The MCE data determined from magnetization measurements for most of the $Gd_5(Si_2Ge_2)$ alloys prepared by reacting the alloy components in a Ta crucible exhibited a double peak structure in the $-\Delta S_m$ vs. T plots (FIGS. 4 and 5). The samples were melted in the Ta crucible with flat lid, FIG. 3A and with an inverted crucible lid, FIG. 3B at 1800 degrees C. for 15 minutes at $10^{-6}$ torr, then the induction furnace power was turned down slowly until the temperature reached 1700 degrees C. (~50 degrees C. below the melting point of the alloy) in 15–30 minutes and held there for 15 minutes. This process was continued in the same manner holding at 1650 degrees C. for 15 minutes and finally for 30 minutes at 1600 degrees C. before turning off the power.

After obtaining these results one of the $Gd_5(Si_2Ge_2)$ samples was remelted at 1800 degrees C. under vacuum of $10^{-6}$ torr and cooled in the same manner as noted in the above paragraph. But since some of the sample did not melt, it was again reheated at 1870 degrees C. for 15 minutes, then cooled to 1750, 1700, and 1650 degrees C. holding for 15 minutes before a final anneal at 1600 degrees C. for 30 minutes. This alloy was then sampled at the top and bottom portions of the ingot. The MCE values were $-\Delta S_m=19$ J/kg K and $T_c=272$ K for a sample taken from the top of the ingot, and $-\Delta S_m=14$ J/kg K and $T_c=287$ K from the bottom of the ingot sample. The difference in the $-\Delta S_m$ values (and the different $T_c$ values) from top to bottom suggested that phase segregation of the melt occurs on solidification because the $Gd_5(Si_2Ge_2)$ material does not melt congruently. Furthermore, the low $-\Delta S_m$ and high Curie temperature for the bottom portion of the ingot suggests that a Si-rich $Gd_5(Si_xGe_{1-x})_4$ phase solidified first, and since the solid phase is expected to be more dense than the liquid phase it sinks to the bottom of the crucible. From published results[3] alloys richer than x=0.5 would exhibit a normal MCE (i.e. $-\Delta S_m<19$ J/kg K) and have a $T_c>275$ K. The last to freeze liquid would be a Ge-rich alloy (x<0.5) which would exhibit the giant MCE (i.e. $-\Delta S_m>19$ J/kg K) and have a $T_c<275$ K,[3] which is what was observed.

Figure 9:
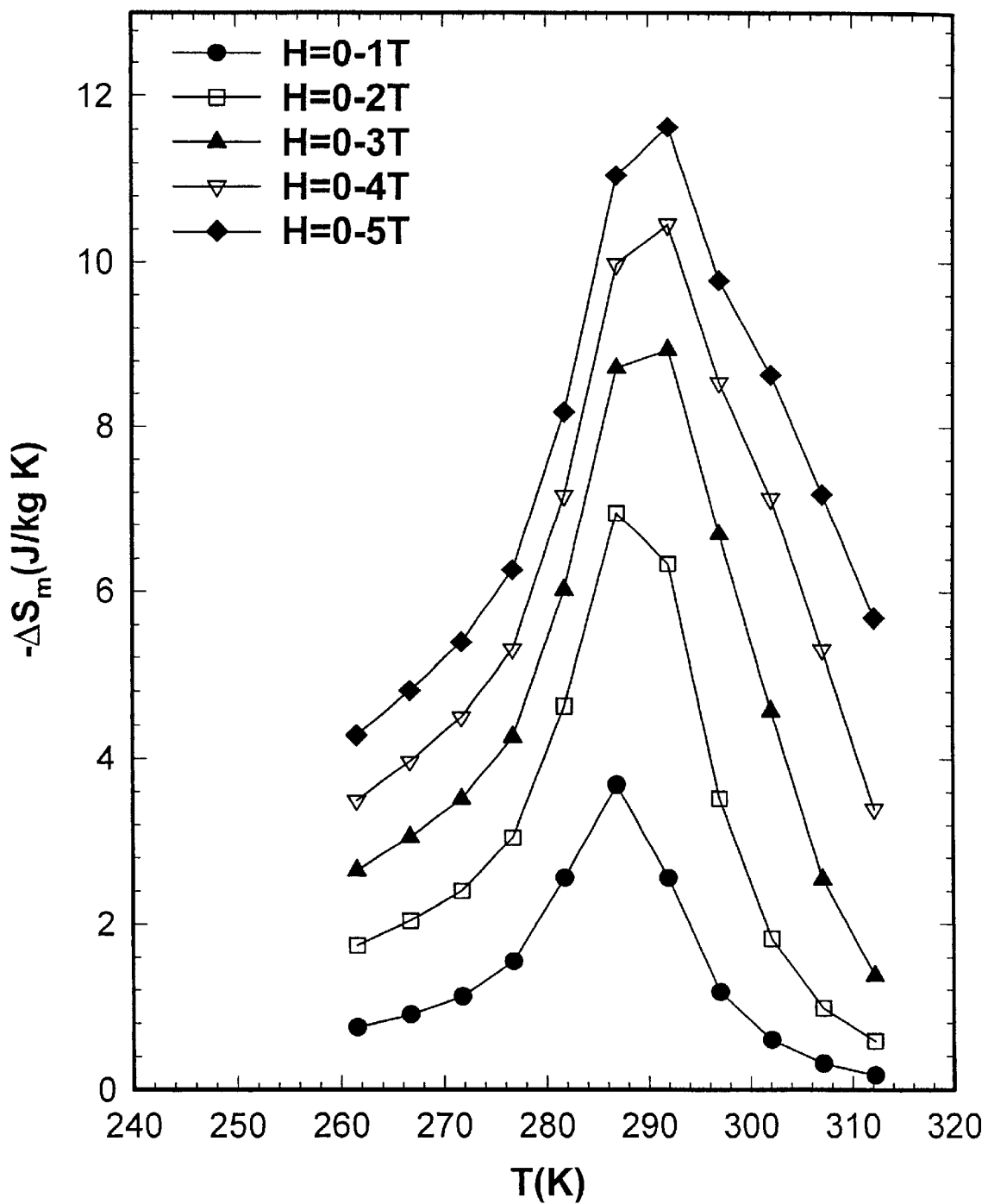
FIG. 9 illustrates the magnetocaloric effect (MCE) properties of $Gd_5(Si_2Ge_2)$ prepared by induction melting commercially available Gd plus Si and Ge pursuant to the invention in a Ta crucible held molten at 1800 degrees C. for 1 hour and rapidly cooled to room temperature. The sample for the measurement was taken from the top of the solidified ingot.
Figure 10:
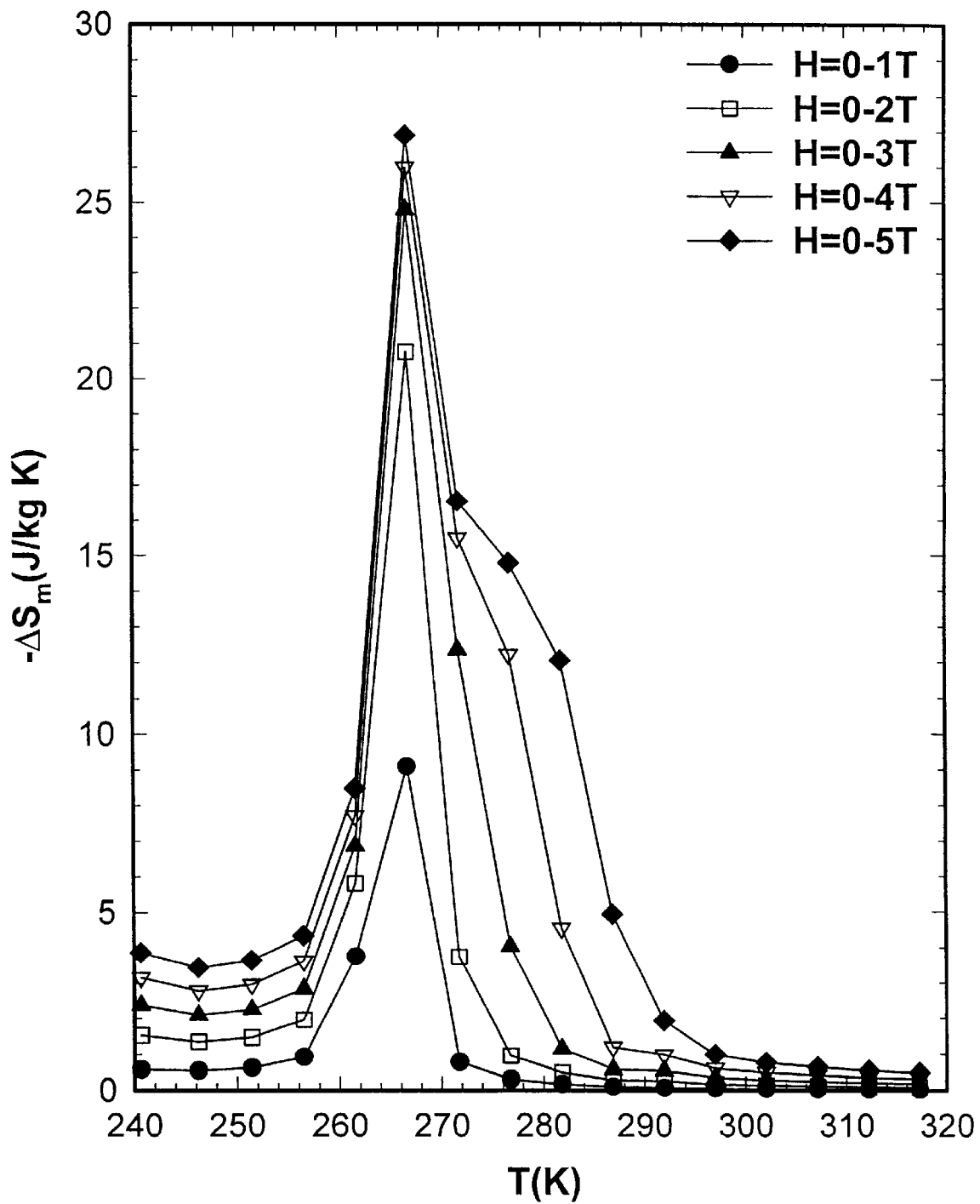
FIG. 10 illustrates the magnetocaloric effect (MCE) properties of $Gd_5(Si_2Ge_2)$ prepared by induction melting commercially available Gd plus Si and Ge pursuant to the invention in a Ta crucible held molten at 1800 degrees C. for 1 hour, rapidly cooled to room temperature, and then heat treated at 1600 degrees C. for 1 hour. The sample for the measurement was taken from the bottom of the solidified ingot.

As a result, rapidly cooling the ingot from the melt should reduce or eliminate this segregation problem. An alloy was melted for one hour at 1800 degrees C. at $10^{-6}$ torr and then rapidly cooled by shutting off the power to the furnace. The $-\Delta S_m$ values were 12 J/kg K for all three samples taken from the top, middle and bottom of the ingot, and $T_c=290$ K was also the same for the 3 locations (a typical plot is shown in FIG. 9). Thus, it can be concluded that segregation does occur on slow cooling and that rapidly cooling a 30 to 40 g sample in a Ta crucible by turning off the power is sufficient to cure the segregation problem. The same alloy was then heat treated at 1600 degrees C. for 1 hour in the crucible under vacuum $10^{-6}$ torr and rapidly cooled. This time the $-\Delta S_m$=27–28 J/kg K and $T_c$=267 K for three different locations in the ingot (top, middle and bottom). A typical $-\Delta S_m$ vs. T plot is shown in FIG. 10. This set of experiments also shows the importance of a high temperature anneal to improve the MCE properties (also see below, the sections on the Si-loss Effect and the Enhanced Giant Magnetocaloric Effect).

This work was extended to larger size samples. A 100 g alloy of $Gd_5(Si_2Ge_2)$ was prepared pursuant to the invention [melted at 1800 degrees C. for 1 hour at $10^{-6}$ torr, rapidly cooled to 1600 degrees C., held for 15 minutes, then held successively at 1500 degrees C. for 15 minutes and 1400 degrees C. for one hour before cooling to room temperature]. Four areas of the ingot were sampled and the maximum $-\Delta S_m$ varied from 19 to 23 (average was 21±2) J/kg K and $T_c$=272 K for all four samples. For a 200 g ingot similar results were obtained: $-\Delta S_m$=20 J/kg K and $T_c$=272 K. Generally, rapid cooling of the melt in the crucible to avoid segregation will involve cooling rates between 360 to 60 degrees C./minute depending upon mass of the melt being solidified.

The Si-loss Effect

Studies of interaction of a $Gd_5(Si_2Ge_2)$ sample arc melted and sealed in a Ta crucible suggested that $Ta_2Si$ may form in the preparation of $Gd_5(Si_2Ge_2)$ at least in the melting stage and perhaps when the solidified ingot is annealed at high temperatures. This would shift the Si:Ge ratio to lower values, i.e. higher Ge contents because of the removal of Si from the alloy. This would account for lower $T_c$ values observed in the alloys induction melted in Ta crucibles; i.e. $T_c \leqq 270$ K, rather than the $T_c$~280 K value for the as-arc-melted material using the low C, O Ames Laboratory (AL) Gd. Furthermore, a series of heat treating experiments was conducted in which a $Gd_5(Si_2Ge_2)$ sample made by induction melting was held at 1600, 1500, 1400 and 1300° C. in the Ta crucible at $10^{-6}$ torr for one hour each and cooled to room temperature for magnetization measurement. After magnetization measurements the sample was reheated for another hour at the next lowest temperature and the cycle was repeated. It was noted that $T_c$ dropped ~5 K between 1600 and 1500 degrees C., and between 1500 and 1400 degrees C., but remained constant for heat treatments at 1300 degrees C. (see Table 2). This suggested that Si was still reacting with the Ta crucible at temperatures above 1400 degrees C. In order to overcome this Si loss, a 0.5% excess of Si was added to the starting amounts of Gd+Si+Ge for the $Gd_5(Si_2Ge_2)$ composition, and the normal heating protocol described above was followed.

TABLE 2

Effect of Heat Treatment on the MCE $(-\Delta S_m)$ and $T_c$.
The Sample was Held at Each Temperature for One Hour Before Rapid Cooling by Turning-off the Power to Induction Furnace. The Heat Treatments are Consecutive.

| Heat Treatment Temp. (° C.) | Tested Portion of Alloy Sample | $-\Delta S_m$ (J/kg K) | $T_c$ (K) |
|---|---|---|---|
| 1600 | Top | 18 | 277 |
| | Bottom | 18 | 277 |
| 1500 | Top | 23 | 272 |
| | Bottom | 25 | 272 |
| 1400 | Top | 28 | 267 |
| 1300 | Top | 27 | 267 |

Eutectoid Decomposition

Figure 11:
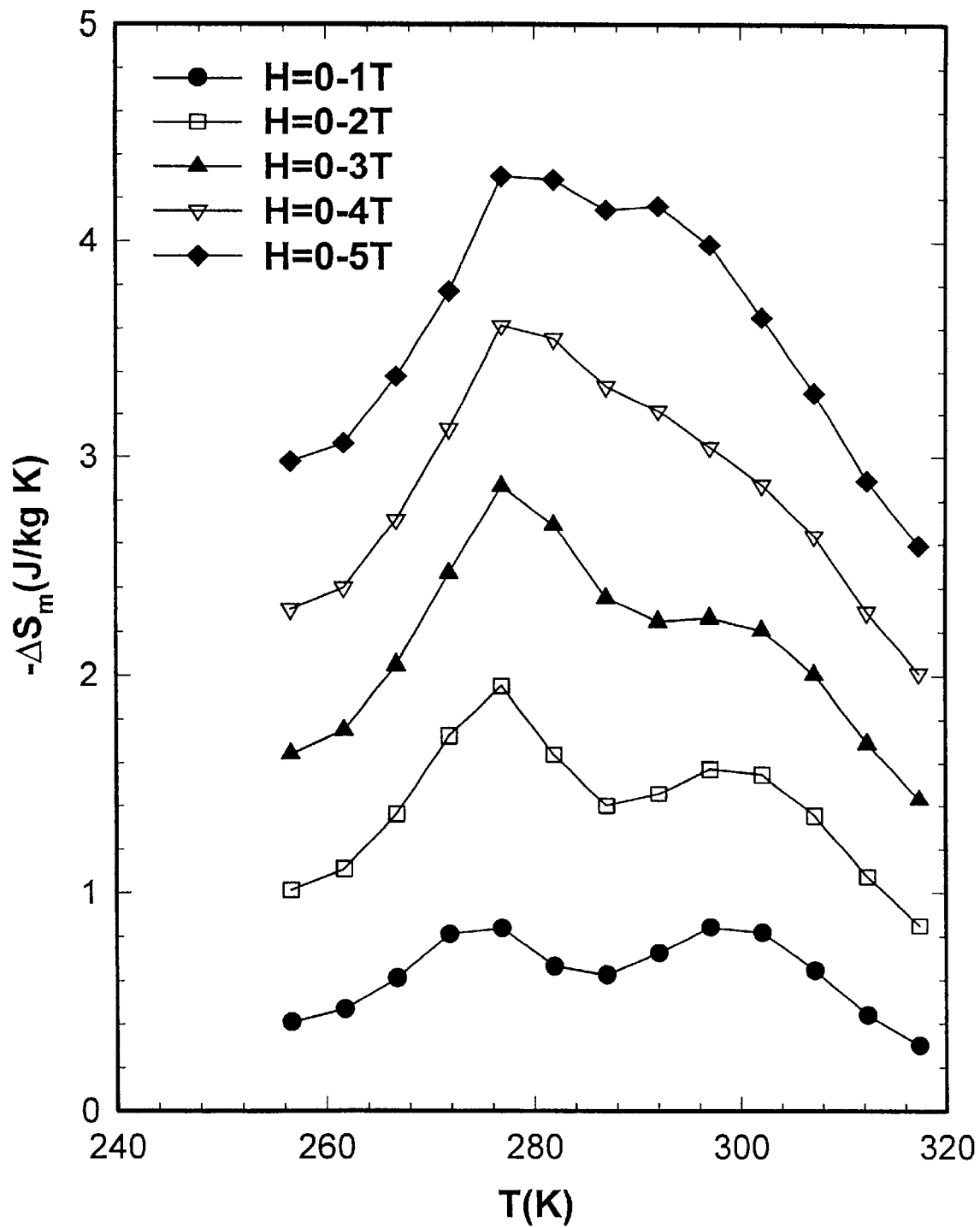
FIG. 11 illustrates the magnetocaloric effect (MCE) properties of $Gd_5(Si_2Ge_2)$ prepared by arc-melting low C, low O (AL) Gd plus Si and Ge (where AL means that the Gd was prepared by the Materials Preparation Center of the Ames Laboratory, Iowa State University, Ames, Iowa). The sample was annealed at 400 degrees C. for 2 weeks.
Figure 12:
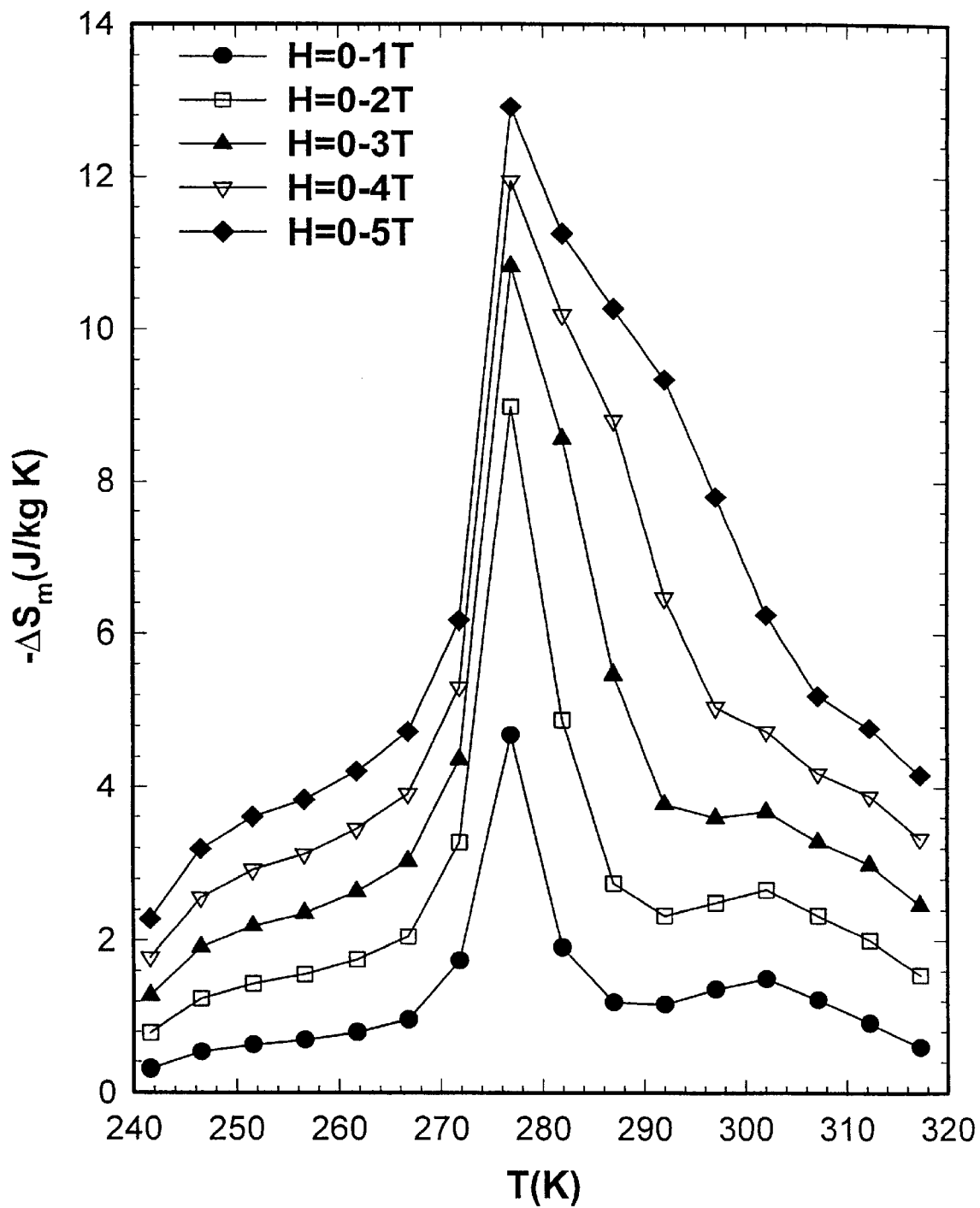
FIG. 12 illustrates the magnetocaloric effect (MCE) properties of $Gd_5(Si_2Ge_2)$ prepared by arc-melting low C, low O (AL) Gd pure Si and Ge. The sample was annealed at 600 degrees C. for 8 days.
Figure 13:
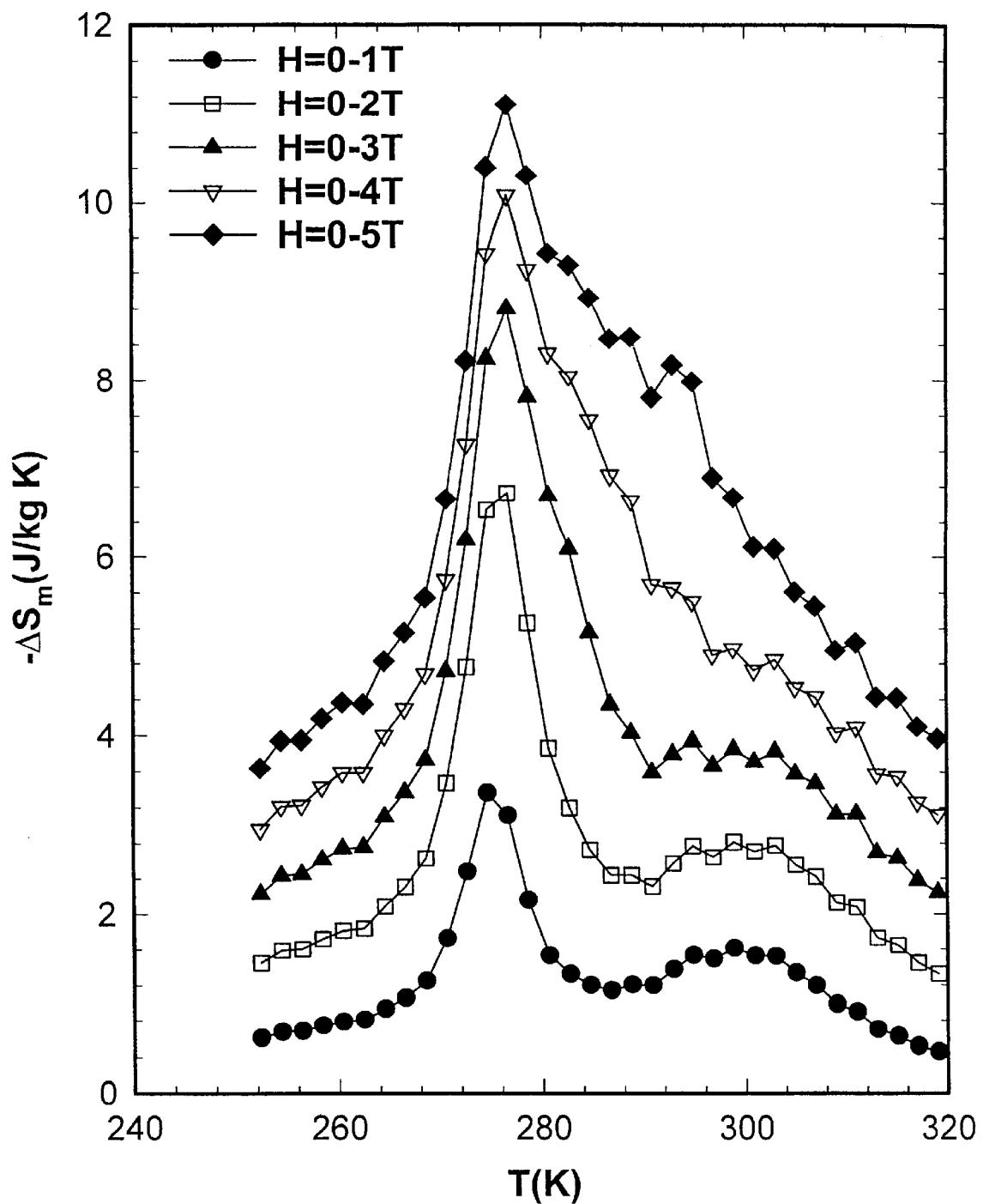
FIG. 13 illustrates the magnetocaloric effect (MCE) properties of $Gd_5(Si_2Ge_2)$ prepared by arc-melting low C, low O (AL) Gd pure Si and Ge. The sample was annealed at 700 degrees C. for 1 week.
Figure 14:
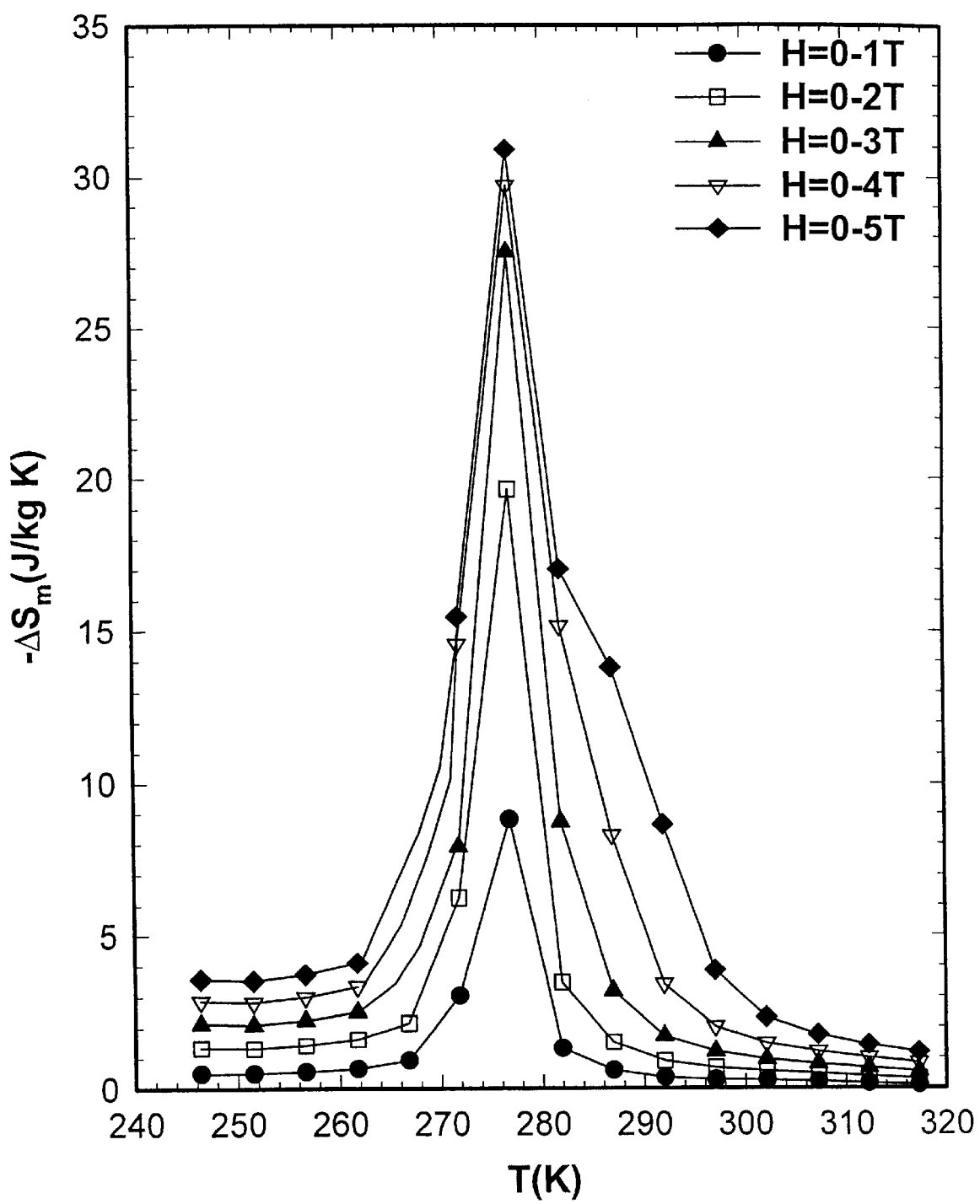
FIG. 14 illustrates the magnetocaloric effect (MCE) properties of arc-melted $Gd_5(Si_2Ge_2)$ prepared by arc-melting low C, low O (AL) Gd pure Si and Ge. The sample was annealed at 900 degrees C. for 3 days.

A series of long term anneals (several days to several weeks) were carried out at various temperatures to see if the $Gd_5(Si_2Ge_2)$ phase was thermodynamic equilibrium phase, since some phase diagram data[8] suggested that $Gd_5Si_4$ decomposes to $Gd_5Si_3$ and GdSi below about 650 degrees C. Arc-melted samples prepared as described above from the low C, O Ames Laboratory (AL) Gd were sealed in quartz tubes back-filled with He and annealed at 400 degrees C. for 2 weeks; 600 degrees C. for 8 days; 700 degrees C. for 1 week; 800, 900 and 1000 degrees C. for 3 days each. The as-arc-melted sample had a $-\Delta S_m$=22.5 J/kg K and $T_c$=277 K. The $T_c$ values remained a constant 277±1 K for all of the annealed samples, but the maximum (FIG. 11) $-\Delta S_m$ values (in J/kg K) were: 4.5 for 400 degrees C. anneal; 12.9 for 600 degrees C. (FIG. 12), 11 for 700 degrees C. (FIG. 13); 26.6 for 800 degrees C.; 30.9 for 900 degrees C. (FIG. 14); and 30.2 for 1000 degrees C. Fortunately this eutectoid decomposition reaction, $Gd_5(Si_2Ge_2) \rightarrow Gd(Si_{0.5}Ge_{0.5})+Gd_5(Si_{1.5}Ge_{1.5})$, occurs rather slowly. If the reaction was rapid, then when the alloys are cooled to room temperature one would have a mixture of $Gd(Si_{0.5}Ge_{0.5})$ and $Gd_5(Si_{1.5}Ge_{1.5})$, and since both of these compounds order magnetically between 50 and 60 K, one would not observe a magnetocaloric effect and magnetic ordering near room temperature. But since a reasonable magnetocaloric effect was observed, this decomposition must take place slowly. For ingots of $Gd_5(Si_2Ge_2)$ (which were prepared by the standard induction melting procedure [described above] from commercial Gd, weighed 100 g or less, heat treated for one hour between 1400 and 1600 degrees C. in the Ta crucible, and furnace cooled to room temperature), $-\Delta S_m$ values of 20 J/kg K, or slightly greater, were obtained. But as the ingot size increased, the $-\Delta S_m$ values were significantly reduced, see Table 3. The lower $-\Delta S_m$ values indicate that some of the $Gd_5(Si_2Ge_2)$ decomposed during cooling. This is due to the fact the cooling process in the larger mass samples takes longer as the sample cools through the critical 700 to about 300 degrees C. temperature region, and more of the $Gd_5(Si_2Ge_2)$ alloy decomposes. Since there is graphite insulation around the crucible, which is necessary to reach 1800 degrees C., it takes several hours to reach ambient temperatures from 1400 degrees C. —about five hours for the 1 kg sample—after the power is turned-off. However, when these samples are reheat treated at 1400 degrees C. and more rapidly cooled through the 700 to about 300 degrees C. region, the $-\Delta S_m$ values were recovered. For example, for the 0.98 kg sample of Table 3, which originally had a $-\Delta S_m$=16.7 J/kg K (Table 3), the reheat treated sample had a $-\Delta S_m$ value of 19.9 J/kg K.

Although the $Gd_5(Si_2Ge_2)$ alloy decomposes between about 300 and 700 degrees C., if the phase can be retained at room temperature it is in a metastable condition and will not decompose. This was demonstrated when the inventors re-examined a sample of the $Gd_5(Si_2Ge_2)$ alloy which had been used in our original study of the discovery of the giant magnetocaloric effect[4]. Five years later the remeasured $-\Delta S_m$ value and $T_c$ were essentially the same, 18.5 J/kg K and 278 K, respectively.

TABLE 3

Effect of Sample Size (Mass) on Resultant MCE $(-\Delta S_m)$

| Ingot Mass (kg) | $-\Delta S_m$ (J/kg K) |
|---|---|
| 0.10 | 20.2 |
| 0.21 | 18.9 |
| 0.51 | 17.0 |

TABLE 3-continued

Effect of Sample Size (Mass) on Resultant MCE (-$\Delta S_m$)

| Ingot Mass (kg) | -$\Delta S_m$ (J/kg K) |
|---|---|
| 0.54 | 16.6 |
| 0.98 | 16.7 |
| 1.02 | 16.5 |

Heating Protocol

The following heating and cooling procedures were used to obtain the optimum magnetocaloric properties of the $Gd_5(Si_xGe_{1-x})_4$ alloys. The Ta crucible and the inverted Ta crucible which serves as a lid are slowly heated from 200 to 1800 degrees C. over a two hour period, and then held at this temperature for 30 minutes to outgas and clean the Ta before the charge is placed into the Ta crucible. The appropriate amounts of Gd+Si+Ge were placed in a Ta crucible, which was covered with the Ta lid and placed in an induction furnace vacuum chamber. The chamber was evacuated to $2\times10^{-6}$ torr, and the Ta crucible and contents were heated slowly from 200 to 1800 degrees C. while maintaining the vacuum. (This usually takes about 2 hours). The charge was held at 1800 degrees C. for 1 hour, and then the power to the induction furnace is turned-off to allow the sample to rapidly solidify to prevent any macrosegregation (see above). To increase the cooling rate a graphite felt radiation shield disposed about the crucible was lifted above the sample. When the temperature reached ~1400 degrees C., the furnace was turned-on and the sample was annealed for 1 hour in the crucible to maximize the MCE (see below). Then the furnace power was turned-off and the sample was allowed to cool to room temperature as quickly as possible to prevent the eutectoid decomposition of the $Gd_5(Si_xGe_{1-x})_4$ phase. The alloy was then checked to verify its MCE properties. This was accomplished by taking at least two samples (one from the bottom, and one from the top) and measuring the appropriate magnetization isotherms as function of magnetic field from 0 to 5 T. For example, for the $Gd_5(Si_2Ge_2)$ composition the isotherms were taken every 5 K from 240 to 320 K. For other compositions the isotherms were measured from ~40 K below and ~40 K above the expected $T_c$ at 5 K intervals.

Enhanced Giant Magnetocaloric Effect

Figure 15A:
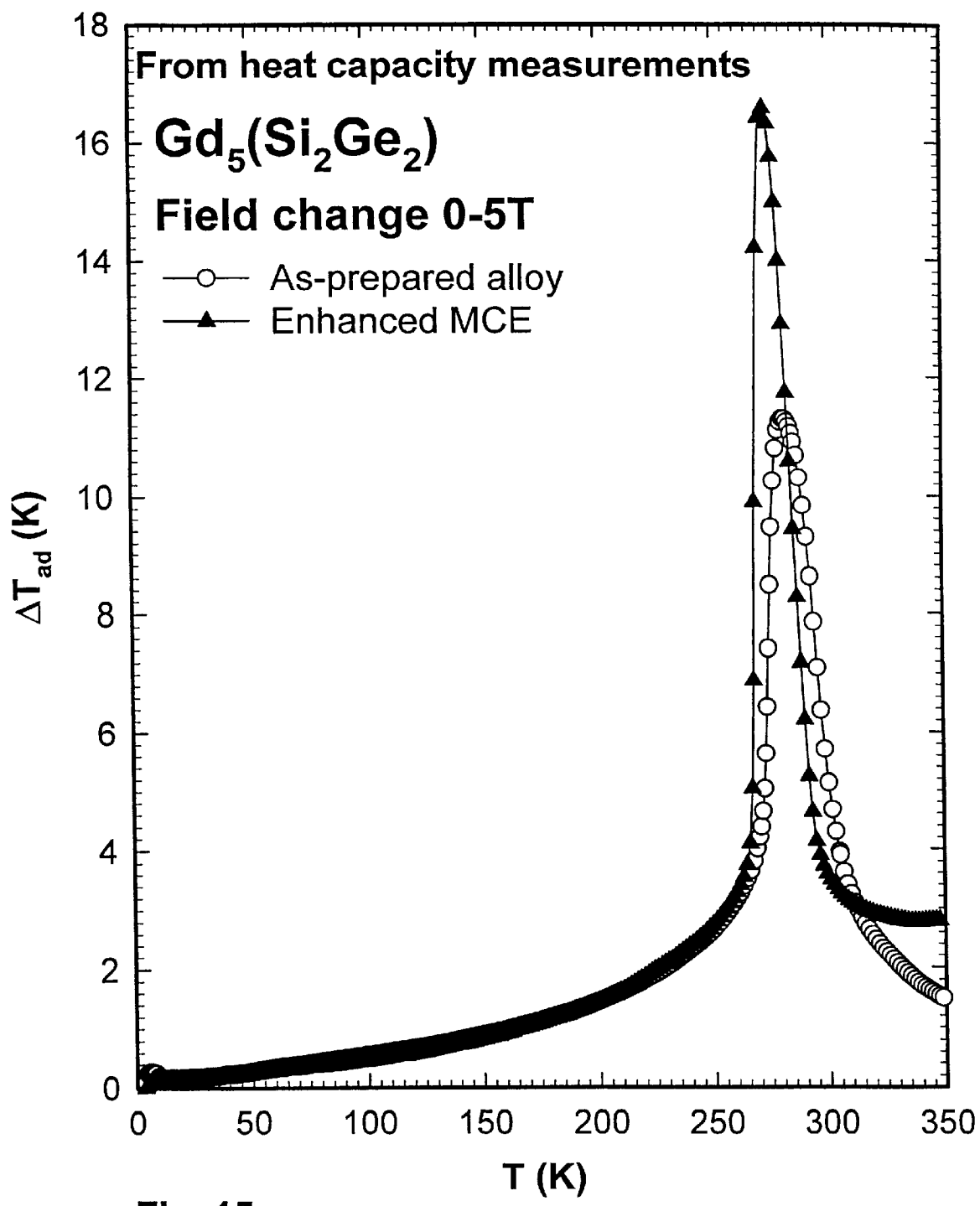
FIG. 15a illustrates the magnetocaloric effect ($\Delta T_{ad}$) of $Gd_5(Si_2Ge_2)$ prepared by arc-melting low C, low O (AL) Gd plus Si and Ge (as-prepared alloy) and the enhancement of the magnetocaloric effect by heat treatment at 1000 degrees C. (Enhanced MCE) as calculated from heat capacity measurements.
Figure 15B:
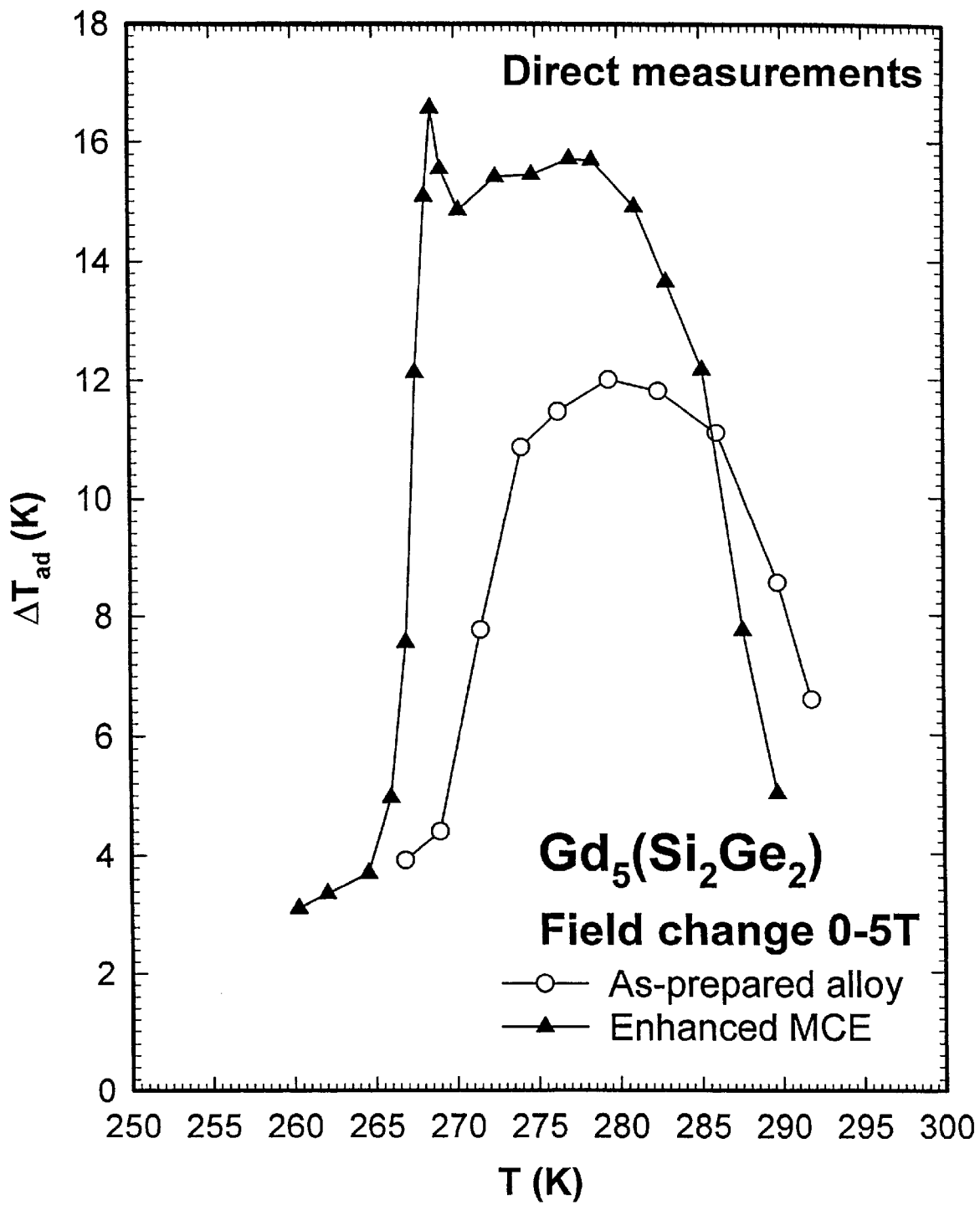
FIG. 15b illustrates the magnetocaloric effect ($\Delta T_{ad}$) of $Gd_5(Si_2Ge_2)$ prepared by arc-melting low C, low O (AL) Gd plus Si and Ge and the enhancement of the magnetocaloric effect by heat treatment at 1000 degrees C. as measured directly.
Figure 15C:
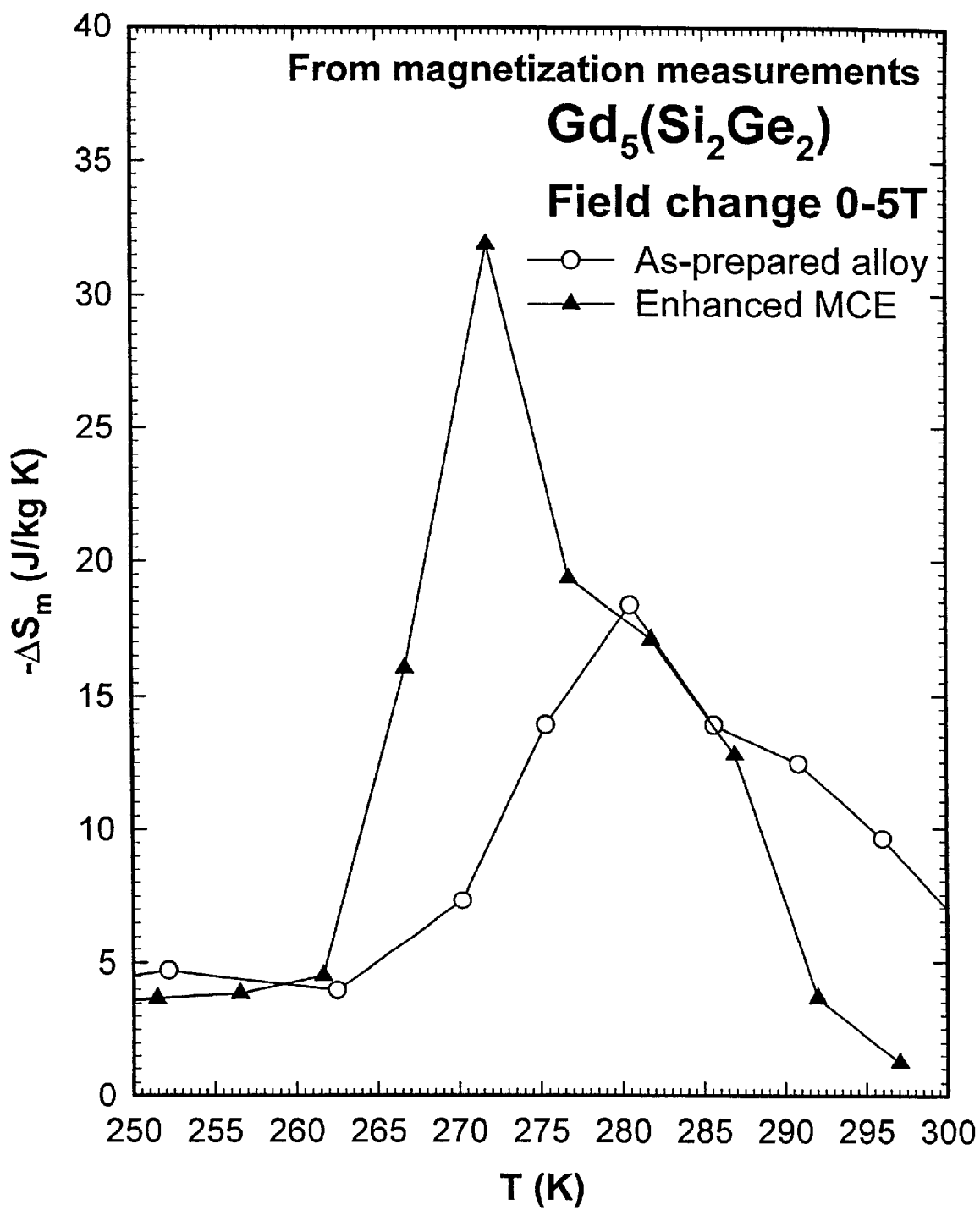
FIG. 15c illustrates the magnetocaloric effect ($-\Delta S_m$) of $Gd_5(Si_2Ge_2)$ prepared by arc-melting low C, low O (AL) Gd plus Si and Ge and the enhancement of the magnetocaloric effect by heat treatment at 1000 degrees C. as calculated from magnetization measurements.

As noted, in the eutectoidal decomposition discussion above, the MCE of $Gd_5(Si_2Ge_2)$ is enhanced by ~40% by annealing at 900 degrees C. for 3 days and ~35% at 1000 degrees C. for 3 days, and ~18% at 800 degrees C. for 3 days compared to the as arc-melted alloy pursuant to U.S. Pat. No. 5,743,095. The 900 and 1000 degrees C. -$\Delta S_m$ values (30.9 and 30.2, respectively) are within experimental error the same. A comparison of the MCE properties of the arc-melted ("as-prepared alloy") without heat treatment with the "Enhanced MCE" arc-melted sample heat-treated at 900 degrees C., both prepared from high purity (low C and O) Ames Laboratory (AL) Gd, is shown in FIGS. 15a–c. FIG. 15a shows the adiabatic temperature rise determined from the high magnetic field calorimetry measurements, while FIG. 15b shows the results of the direct measurements of $\Delta T_{ad}$. FIG. 15c compares the -$\Delta S_m$ values obtained from magnetization measurements. This enhanced MCE (-$\Delta S_m$) is 50% greater than previously reported on the discovery of the giant magnetocaloric effect.[4] For the $Gd_5(Si_xGe_{1-x})_4$ where $0.375 \leq x \leq 0.525$ materials a heat treatment at 1300 degrees C. for 2 to 10 hours (where the time of the heat treatment depends upon the composition) also dramatically enhances the MCE.

An enhanced MCE for $Gd_5(Si_2Ge_2)$ which was prepared by induction melting using commercially pure Gd was also obtained. A series of annealing studies was conducted on $Gd_5(Si_2Ge_2)$ prepared by induction melting and holding at 1800 degrees C. for 1 hour at $10^{-6}$ torr and rapid cooling by shutting off the furnace power and followed by consecutive 1 hour anneals at 1600, 1500, 1400, 1300 degrees C. in a Ta crucible. The -$\Delta S_m$ values were, respectively, 18, 24, 28 and 27 J/kg K (see Table 2). This means the optimum enhanced MCE effect can be obtained by heat treating $Gd_5(Si_2Ge_2)$ made using commercially pure Gd at ~1400 degrees C. for 1 hour. A one hour 1400 degrees C. heat treatment is also sufficient for the $Gd_5(Si_xGe_{1-x})_4$ for $0.4 \leq x \leq 0.5$. Heat treatment in the range 800 degrees C. to 1600 degrees C. may be employed to increase the MCE effect. For the commercial $Gd_5(Si_xGe_{1-x})$ alloys (where $0.5 \leq x \leq 0.525$) the heat treatment times at 1400 degrees C. varies linearly with composition for 1 hour at x=0.5 to 10 hours at x=0.525.

Furthermore, the maximum value of -$\Delta S_m$ (28 J/kg K) for the $Gd_5(Si_2Ge_2)$ phase prepared by induction melting as described above using commercially pure Gd is only 12% less than the best value (32 J/kg K) obtained using low C, O Ames Laboratory (AL) Gd to prepare the $Gd_5(Si_2Ge_2)$.

Production of the Giant Magnetocaloric Effect Materials ($Gd_5(Si_xGe_{1-x})_4$ with the Improvement in the Magnetocaloric Properties An embodiment of the invention provides a method for the production of large quantities of the giant magnetocaloric effect $Gd_5(Si_xGe_{1-x})_4$ materials as follows. The starting components are: (1) commercially available (pure) gadolinium (Gd) having a purity described above (commercial source is Tianjiao International Trading Co., Burlingame, Calif.); (2) commercially available (pure) silicon (Si) typically 99.99 to 99.9999 wt. % pure (commercial source is Alfa Asar, Ward Hill, Mass.); and (3) commercially available (pure) germanium (Ge) typically 99.99 to 99.9999 wt. % pure (commercial source is Meldform Metals, Royston, Herts, England). The $Gd_5(Si_xGe_{1-x})_4$ alloys are produced in tantalum (Ta) or tungsten (W) crucibles made to a size large enough to hold the desired amount of starting materials and produced alloy. Generally a crucible should be filled to no more than 50% full to prevent the components from splashing out of the crucible during the initial melting when the mixture heats up due to the large exothermic heat of formation of $Gd_5(Si_xGe_{1-x})_4$ when elemental Gd, Si, and Ge are reacted.

Stoichiometric amounts of Gd, Si, and Ge charge components with up to 0.5 wt. % excess Si are placed in an out-gassed Ta or W crucible and the crucible is loosely covered with a Ta lid. To prevent excessive dissolving of Ta by molten Gd a small amount of already prepared $Gd_5(Si_xGe_{1-x})_4$ alloy is placed at the bottom of the crucible. The Gd is placed on top of this alloy, then the crucible is loaded with Si and finally with Ge. The crucible is then placed inside an induction furnace chamber and the chamber is evacuated to $10^{-6}$ torr of residual gas pressure. The mixture is slowly heated to 1800 degrees C. and held at this temperature for one hour. During heating it is important to observe both the changes in pressure inside the reaction chamber and the temperature of the crucible. The pressure typically increases between 300 to 700 degrees C. indicating that the components for the $Gd_5(Si_xGe_{1-x})_4$ alloy (i.e. elemental Gd, Si, and Ge) begin to out-gas. At this moment the power to the induction coil should not be increased and the mixture should be allowed enough time at constant temperature between 300–700 degrees C. to completely out-gas, which is observed as the return of the pressure to a target of $10^{-6}$ torr. As the temperature rises above ~940 degrees C., elemental Ge melts and reacts with Gd and Si, which causes an increase in the temperature inside the reaction chamber. The power to the induction coil must be reduced by 1 to 50% so as not to allow rapid overheating of the reacting mixture and to prevent excessive reaction of Gd and Si with Ta. A second spontaneous increase in temperature may occur approximately at 1400 degrees C. when the remaining non-reacted Si and Si+Ge solid solution melt and the chemical reaction

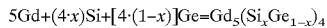

$$5Gd+(4\cdot x)Si+[4\cdot(1-x)]Ge=Gd_5(Si_xGe_{1-x})_4$$

is completed.

When the chemical reaction is complete (which is observed as the decrease in crucible temperature) the furnace power is ramped until temperature of the crucible reaches 1800 degrees C. to completely melt the alloy. A constant 1800 degrees C.±10 degrees C. temperature should be maintained for one hour. The one hour melting time has been experimentally established to be adequate to: (1) homogenize the molten alloy; (2) oxidize the carbon (C) impurity with oxygen (O) [both are present in the starting Gd stock]; and (3) prevent excessive reaction of Si with the crucible material (Ta).

After one hour melting time the power to induction coil must be instantly reduced to 0 allowing liquid $Gd_5(Si_xGe_{1-x})_4$ alloy to solidify as rapidly as possible. Since the crucible containing the $Gd_5(Si_xGe_{1-x})_4$ alloy is placed inside a graphite heat shield to reduce excessive heat losses while holding the melt at 1800 degrees C., the graphite heat shield is quickly removed by using a hoist simultaneously with turning the power off. When the temperature of the crucible drops below 1400 degrees C. the power to induction coil is again turned on and adjusted to maintain the crucible containing the solidified alloy at 1400 degrees C.±10 degrees C. for 1 to 10 hours depending on the composition. The temperature and the heat treatment were established experimentally to be adequate to homogenize the as-solidified casting. The heat treatment at 1400 degrees C. not only homogenizes and further purifies the alloy, but also brings about the enhanced magnetocaloric effect, which is approximately 40 to 50% larger than the magnetocaloric effect observed in small arc-melted button prepared from high-purity gadolinium and in non-heat treated alloys and changes the nature of the phase transformation from a second to a first order phase transformation for the $0.5<x\leq0.525$ alloys. These materials should be taken from the crucible after melting and broken into small pieces (equal to or less than 1 $cm^3$) and then heat treated at 1400 degrees C. for 1 to 10 hours.

The heat treated $Gd_5(Si_xGe_{1-x})_4$ alloy will have a homogenous microstructure comprising the room temperature monoclinic crystallographic phase $Gd_5(Si_xGe_{1-x})_4$ for $0.375\leq x\leq0.525$, orthorhombic (I) crystallographic phase $Gd_5(Si_xGe_{1-x})_4$ for $0\leq x<0.30$, a mixture of both crystallographic forms for $0.30<x<0.375$, or orthorhombic (II) crystallographic phase $Gd_5(Si_xGe_{1-x})_4$ for $0.525<x\leq1.0$ exhibiting a magnetic entropy change ($\Delta S_M$) of at least 16 J/kg K, a magnetostriction of at least 2000 parts per million, and a magnetoresistance of at least 5%.

When the heat treatment is complete, the power to induction coil is turned-off and the crucible and the alloy are allowed to cool to room temperature, as quickly as possible to ambient temperature to prevent the eutectoid decomposition. Conversely, one can remove the crucible holding the $Gd_5(Si_xGe_{1-x})_4$ phase from the heat shield assembly when the power is turned-off to obtain the same effect. The critical temperature region is 700 to 200 degrees C.—the faster the sample can be cooled through this region the larger the MCE. The minimum critical time for cooling through this region is about one hour.

After the sample is at room temperature the crucible is then extracted from the reaction chamber and the alloy is separated from the crucible by gently pounding the crucible, which breaks the weak bond formed between the Ta crucible walls and the $Gd_5(Si_xGe_{1-x})_4$ ingot. Finally magnetization measurements are carried out on at least two ingot samples taken from the top and the bottom portions of the ingot, and the magnetocaloric effect is calculated to verify the ingot homogeneity and the presence of the enhanced giant magnetocaloric effect. In the case of the colossal magnetostriction alloy the volumetric magnetostriction is also verified by the appropriate measurements.

EXAMPLE 1

Preparation of 1 kg of $Gd_5(Si_2Ge_2)$ magnetic material with the enhanced giant magnetocaloric effect, colossal magnetostriction, and giant magnetoresistance between 275 and 300 K in magnetic fields varying between 0 and 5 T.

1. Density of the $Gd_5(Si_2Ge_2)$ alloy is 7.53 $g/cm^3$. Therefore, 1 kg of the prepared alloy will have an approximate volume of 133 $cm^3$. The total crucible volume should not be less than 270 $cm^3$ and preferably should be 300 $cm^3$ or more. Therefore, a crucible of at least 3.1 cm diameter and at least 10 cm tall should be chosen and out-gassed between 1000 and 1800 degrees C. for 30 minutes.
2. The $Gd_5(Si_2Ge_2)$ alloy contains 79.612 wt. % Gd, 5.688 wt. % Si, and 14.700 wt. % Ge. Therefore, the crucible (see item 1, above) is initially loaded with ~100 g of previously prepared $Gd_5(Si_2Ge_2)$ to prevent the reaction of molten Gd with Ta before the Gd reacts with the Si and Ge to form the ternary compound. Then it is loaded successively with 796.12±0.01 g of commercially available Gd, with 56.88±0.01 g of commercially available Si, and finally the crucible is loaded with 147.00±0.01 g of commercially available Ge. When loading of the elemental components is complete, the crucible with its content is loosely covered with a Ta lid and is placed inside an induction furnace reaction chamber. A thermocouple calibrated in the temperature range between the room temperature and at least 1900 degrees C. is placed in close vicinity of the crucible (the gap between the thermocouple jacket and the outside of the crucible should be between 0.1 and 1 mm) and at one half of the height of the alloy in the crucible after it has been melted.
3. When the crucible loading is complete, the reaction chamber is evacuated allowing the pressure inside the reaction chamber to reach $10^{-5}$ to $10^{-6}$ torr.
4. When reaction chamber vacuum reaches $10^{-5}$ to $10^{-6}$ torr residual pressure, an induction coil is energized allowing the temperature of Ta crucible loaded with elemental Gd, Si, and Ge, and loosely covered with a Ta lid (see item 2, above) to increase above 300 degrees C. or higher.
5. When the temperature of the crucible exceeds 300 degrees C. a sudden increase in the reaction chamber pressure occurs, the induction coil power is held constant allowing enough time for out-gassing of elemental Gd, Si, and Ge and the pressure to return to $10^{-5}$ to $10^{-6}$ torr. Then the power is ramped again until the temperature of the crucible reaches approximately 940 degrees C.

6. At approximately 940 degrees C. elemental Ge melts and flows to the bottom of the crucible dissolving some Si and reacting with Gd. This usually releases some heat due to the reactions $$x\text{Gd}+y\text{Ge}=\text{Gd}_x\text{Ge}_y \text{ and}$$

$$x\text{Gd}+y(\text{Si}_z\text{Ge}_{1-z})=\text{Gd}_x(\text{Si}_z\text{Ge}_{1-z})_y$$

where x=1 or 5, y=1, 2, 3, or 4, and z is between 0 and 1, and the temperature of the crucible spontaneously increases. The power to the induction coil is reduced by 1 to 50% depending on the rate of spontaneous temperature increase.

7. When the temperature of the crucible is stabilized, or when it begins to decrease, this indicates that the chemical reactions mentioned in item 6 are complete, and the power of the induction furnace is again increased ramping the temperature above 940 degrees C.

8. Between 940 degrees C. and 1800 degrees C. (the later being the target temperature) one or more spontaneous temperature increases can occur indicating the melting of the $\text{Si}_2\text{Ge}_{1-z}$ solid solution and the remaining Si, and the additional chemical reactions $$x1\text{Gd}+y1(\text{Si}_z\text{Ge}_{1-z})=\text{Gd}_{x1}(\text{Si}_z\text{Ge}_{1-z}) \text{ and}$$

$$x2\text{Gd}_x(\text{Si}_z\text{Ge}_{1-z})_{y1}+y2\text{Si}=\text{Gd}_{x3}(\text{Si}_{z1}\text{Ge}_{1-z1})_{y3},$$

which release the remaining heat of the final reaction $$5\text{Gd}+2\text{Si}+2\text{Ge}=\text{Ge}_5(\text{Si}_2\text{Ge}_2)$$

Spontaneous increases in temperature generally are not observed above melting temperature of Si (1414 degrees C.). In each case when spontaneous temperature increase occurs, the power to the induction furnace is manipulated as described in items 6 and 7, above.

9. When the temperature of the crucible reaches 1800 degrees C., the furnace is held at constant power without allowing temperature fluctuations exceeding ±10 degrees C. for one hour. The carbon (C) impurity is oxidized by the oxygen (O) impurity during this one hour time period according to the following chemical reactions:

$$C+O^*=CO \text{ and}$$

$$C+2O^*=CO_2, \text{ or } CO+O^*=CO_2,$$

where O* is oxygen dissolved in the molten $(\text{Gd}_5(\text{Si}_2\text{Ge}_2))$ alloy and a mixture of CO and $CO_2$ is pumped away from the melt and from the reaction chamber. Since the reaction occurs in the melt and the concentration of both C and O is quite low, this process does not distort the vacuum inside the reaction chamber. Since the alloy is liquid at 1800 degrees C., the diffusivity of all atomic species (including Gd, Si, Ge, C and O) is relatively high and as established experimentally the one hour holding provides adequate time for complete homogenization of the liquid $\text{Gd}_5(\text{Si}_2\text{Ge}_2)$ alloy and the reduction of the C content to a level at which it no longer has a deleterious effect on the MCE properties.

10. After one hour the furnace power is rapidly reduced to zero allowing the molten $\text{Gd}_5(\text{Si}_2\text{Ge}_2)$ alloy to rapidly solidify, which prevents macroscopic segregation.

11. When the temperature of the crucible falls below 1400 degrees C., the induction coil is re-energized and the crucible temperature with the solidified $\text{Gd}_5(\text{Si}_2\text{Ge}_2)$ alloy is stabilized at 1400 degrees C. and is held for one hour. This allows adequate time for homogenization of as-solidified $\text{Gd}_5(\text{Si}_2\text{Ge}_2)$ alloy, and/or stress relief, and/or further grain purification by diffusing the impurities out of the grains and precipitating them on the inter-grain boundaries. All or some of the effects described in this item bring about the enhanced magnetocaloric effect in $\text{Gd}_5(\text{Si}_2\text{Ge}_2)$ alloy.

12. After holding 1400 degrees C. for one hour, the induction furnace power is turned-off and the crucible containing the $\text{Gd}_5(\text{Si}_2\text{Ge}_2)$ alloy is allowed to cool to room temperature as rapidly as possible to prevent the eutectoid decomposition of the $\text{Gd}_5(\text{Si}_2\text{Ge}_2)$ alloy. The crucible is then extracted from the reaction chamber and the material is removed from the crucible by gently pounding on the walls and the bottom of the crucible. Two samples (one from the top and one from the bottom portions of the ingot) are taken and their magnetization or magnetostrictive behavior in the range 240 to 320 K are measured. The magnetocaloric effect is then calculated to ensure that the obtained ingot is homogeneous and displays the enhanced giant magnetocaloric effect.

EXAMPLE 2

Preparation of 5 kg $\text{Gd}_5(\text{SiGe}_3)$ magnetic material with the enhanced giant magnetocaloric effect, colossal magnetostriction and giant magnetoresistance between 130 and 160 K in magnetic fields varying between 0 and 5 T.

1. Density of the $\text{Gd}_5(\text{SiGe}_3)$ alloy is 7.77 g/cm³. Therefore, 5 kg of the prepared alloy will have an approximate volume of 644 cm³. The total crucible volume should not be less than 1300 cm³ and preferably should be 1500 cm³ or more. Therefore, a crucible of at least 7 cm diameter and at least 10 cm tall should be chosen and out-gassed at between 1000 and 1800 degrees C. for 30 minutes.

2. The $\text{Gd}_5(\text{SiGe}_3)$ alloy contains 76.179 wt. % Gd, 2.721 wt. % Si, and 21.100 wt. % Ge. Therefore, the crucible (see item 1, above) is initially loaded with ~500 g of previously prepared $\text{Gd}_5(\text{SiGe}_3)$ to prevent the reaction of molten Gd with Ta before the Gd reacts with the Si and Ge to form the ternary compound. Then it is loaded successively with 3808.95±0.01 g of commercially available Gd, with 136.05±0.01 g of commercially available Si, and finally the crucible is loaded with 1055.00±0.01 g of commercially available Ge. When loading of the elemental components is complete, the crucible with its contents is loosely covered with a Ta lid and is placed inside an induction furnace reaction chamber. A thermocouple calibrated in the temperature range between the room temperature and at least 1900 degrees C. is placed in close vicinity of the crucible (the gap between the thermocouple jacket and the outside of the crucible should be between 0.1 and 1 mm) and at one half of the height of the alloy in the crucible after it has been melted.

3. When the crucible loading is complete, the reaction chamber is evacuated allowing the pressure inside the reaction chamber to reach $10^{-5}$ to $10^{-6}$ torr.

4. When reaction chamber vacuum reaches $10^{-5}$ to $10^{-6}$ torr residual pressure, an induction coil is energized allowing the temperature of Ta crucible loaded with elemental Gd, Si, and Ge, and loosely covered with a Ta lid (see item 2, above) to increase above 300 degrees C.

5. When the temperature of the crucible exceeds 300 degrees C. a sudden increase in the reaction chamber pressure occurs, the induction coil power is held constant allowing enough time for out-gassing of elemental Gd, Si, and Ge and the pressure to return to $10^{-5}$ to $10^{-6}$ torr. Then the power is ramped again until the temperature of the crucible reaches approximately 940 degrees C.

6. At approximately 940 degrees C. elemental Ge melts and flows to the bottom of the crucible dissolving some Si and reacting with Gd. This usually releases some heat due to the reactions $$xGd + yGe = Gd_xGe_y \text{ and}$$

$$xGd + y(Si_zGe_{1-z}) = Gd_xSi_{1-z})_y$$

where x=1 or 5, y=1, 2, 3, or 4, and z is between 0 and 1, and the temperature of the crucible spontaneously increases. The power to the induction coil is reduced by 1 to 50% depending on the rate of spontaneous temperature increase.

7. When the temperature of the crucible is stabilized, or when it begins to decrease, this indicates that the chemical reactions mentioned in item 6 are complete, and the power of the induction furnace is again increased ramping the temperature above 940 degrees C.

8. Between 940 degrees C. and 1800 degrees C. (the later being the target temperature) one or more spontaneous temperature increases can occur indicating the melting of the $Si_zGe_{1-z}$ solid solution and the remaining Si, and the additional chemical reactions $$x1Gd + y1(Si_zGe_{1-z}) = Gd_{x1}(Si_zGe_{1-z})_{y1} \text{ and}$$

$$x2Gd_x(Si_zGe_{1-z})_{y1} + y2Si = Gd_{x3}(Si_{z1}Ge_{1-z1})_{y3},$$

which release the remaining heat of the final reaction $$5Gd + Si + 3Ge = Ge_5(SiGe_3)$$

Spontaneous increases in temperature generally are not observed above melting temperature of Si (1414 degrees C.). In each case when spontaneous temperature increase occurs, the power to the induction furnace is manipulated as described in items 6 and 7, above.

9. When the temperature of the crucible reaches 1800 degrees C., the furnace is held at constant power without allowing temperature fluctuations exceeding ±10 degrees C. for one hour. The carbon (C) impurity is oxidized by the oxygen (O) impurity during this one hour time period according to the following chemical reactions:

$$C + O^* = CO \text{ and}$$

$$C + 2O^* = CO_2, \text{ or } CO + O^* = CO_2,$$

where O* is oxygen dissolved in the molten $Gd_5(Si_2Ge_2)$ alloy and a mixture of CO and $CO_2$ is pumped away from the melt and from the reaction chamber. Since the reaction occurs in the melt and the concentration of both C and O is quite low, this process does not distort the vacuum inside the reaction chamber. Since the alloy is liquid at 1800 degrees C., the diffusivity of all atomic species (including Gd, Si, Ge, C and O) is relatively high and as established experimentally the one hour holding provides adequate time for complete homogenization of the liquid $Gd_5(SiGe_3)$ alloy and the reduction of the C content level which no longer has a deleterious effect on the MCE properties.

10. After one hour the furnace power is rapidly reduced to zero allowing the molten $Gd_5(SiGe_3)$ alloy to rapidly solidify, which prevents macroscopic segregation.

11. When the temperature of the crucible falls below 1400 degrees C., the induction coil is re-energized and the crucible temperature with the solidified $Gd_5(SiGe_3)$ alloy is stabilized at 1400 degrees C. and is held for one hour. This allows adequate time for homogenization of as-solidified $Gd_5(SiGe_3)$ alloy, and/or stress relief, and/or further grain purification by diffusing the impurities out of the grains and precipitating them on the inter-grain boundaries. All or some of the effects described in this item bring about the enhanced magnetocaloric effect in $Gd_5(SiGe_3)$ alloy.

12. After holding 1400 degrees C. for one hour, the induction furnace power is turned-off and the crucible containing the $Gd_5(SiGe_3)$ alloy is allowed to cool to room temperature as quickly as possible to prevent the eutectoid decomposition of the $Gd_5(SiGe_3)$ alloy. Because of the large mass of material (>5 kg), a special effort is required to assure the rapid cooling. This would include: removal of the crucible containing the desired alloy from the hot zone, addition of helium exchange gas, employment of a quenching medium, etc. The crucible is then extracted from the reaction chamber and the material is removed from the crucible by gently pounding on the walls and the bottom of the crucible. Two samples (one from the top and one from the bottom portions of the ingot) are taken and their magnetization or magnetostrictive behavior in the range 100 to 180 K are measured. The magnetocaloric effect is then calculated to ensure that the obtained ingot is homogeneous and displays the enhanced giant magnetocaloric effect.

Magnetocaloric Behavior of $Gd_5(Si_xGe_{1-x})_4$ Alloys for $0.5<x\leq1.0$

Although the monoclinic form of $Gd_5(Si_xGe_{1-x})_4$, which exhibits the giant magnetocaloric effect, can be stabilized above x=0.5 (i.e. between x=0.5 and x=0.525) by appropriate heat treating, the orthorhombic form, which has good (but not giant) magnetocaloric properties, can easily be obtained between $0.5<x\leq1.0$, i.e. there is an overlapping composition region $0.5\leq x\leq0.525$ where either phase can be obtained.

Figure 16:
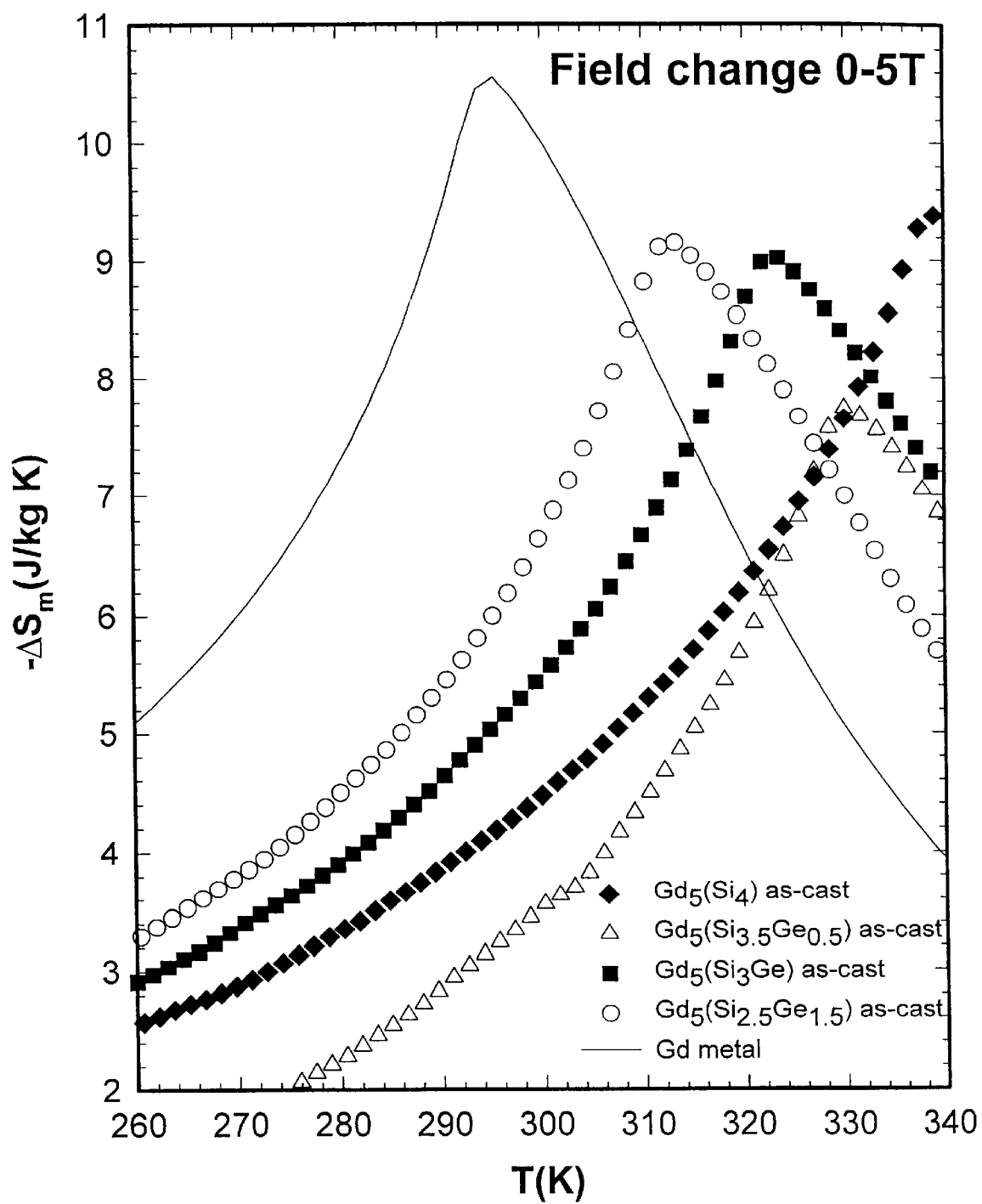
FIG. 16 illustrates the magnetocaloric effect ($-\Delta S_m$) for four $Gd_5(Si_xGe_{1-x})_4$ alloys with $0.525 < x \leq 1.0$ for a magnetic field change of 0 to 5 T as determined from heat capacity measurements. The as-cast samples were prepared by arc-melting high purity (low C and O) (AL) Gd plus Si and Ge. Also included is the $-\Delta S_m$ value for Gd (low C and O) metal.

The magnetocaloric properties ($-\Delta S_m$) for the $Gd_5(Si_xGe_{1-x})_4$ alloys with x=0.625, 0.75, 0.875 and 1.0 [i.e. $Gd_5(Si_{2.5}Get_{1.5})$, $Gd_5(Si_3Ge)$, $Gd_5(Si_{3.5}Ge)$ and $Gd_5Si_4$] and made by arc-melting low C, low O (AL) Gd plus Si and Ge are shown in FIG. 16, along with that of gadolinium metal. Although the $-\Delta S_m$ values are about 15% less than that of gadolinium they are still substantial and are the largest known for any substance in the 305 to 335 K range. This makes these alloys candidate materials for the high temperature side of active magnetic regenerators for the rejection of heat for near room temperature cooling devices. They are also attractive materials for low temperature heat pumps.

Figure 21A:
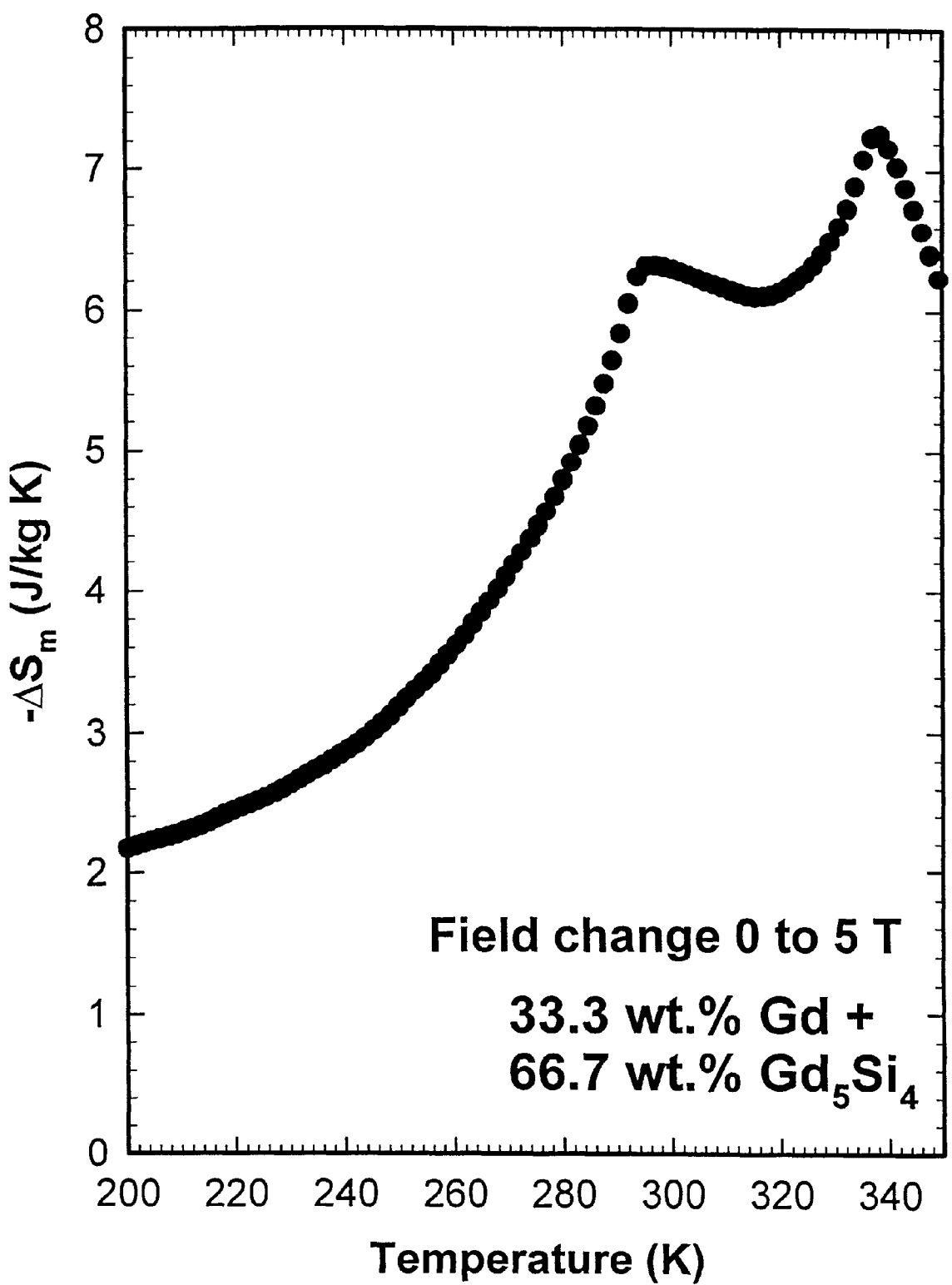
FIG. 21a illustrates the magnetocaloric effect, $-\Delta S_m$, vs. temperature for a two layered regenerator bed (or for a dual stage cooling device) using Gd as the low temperature layer (stage) and $Gd_5Si_4$ as the high temperature layer (stage).
Figure 21B:
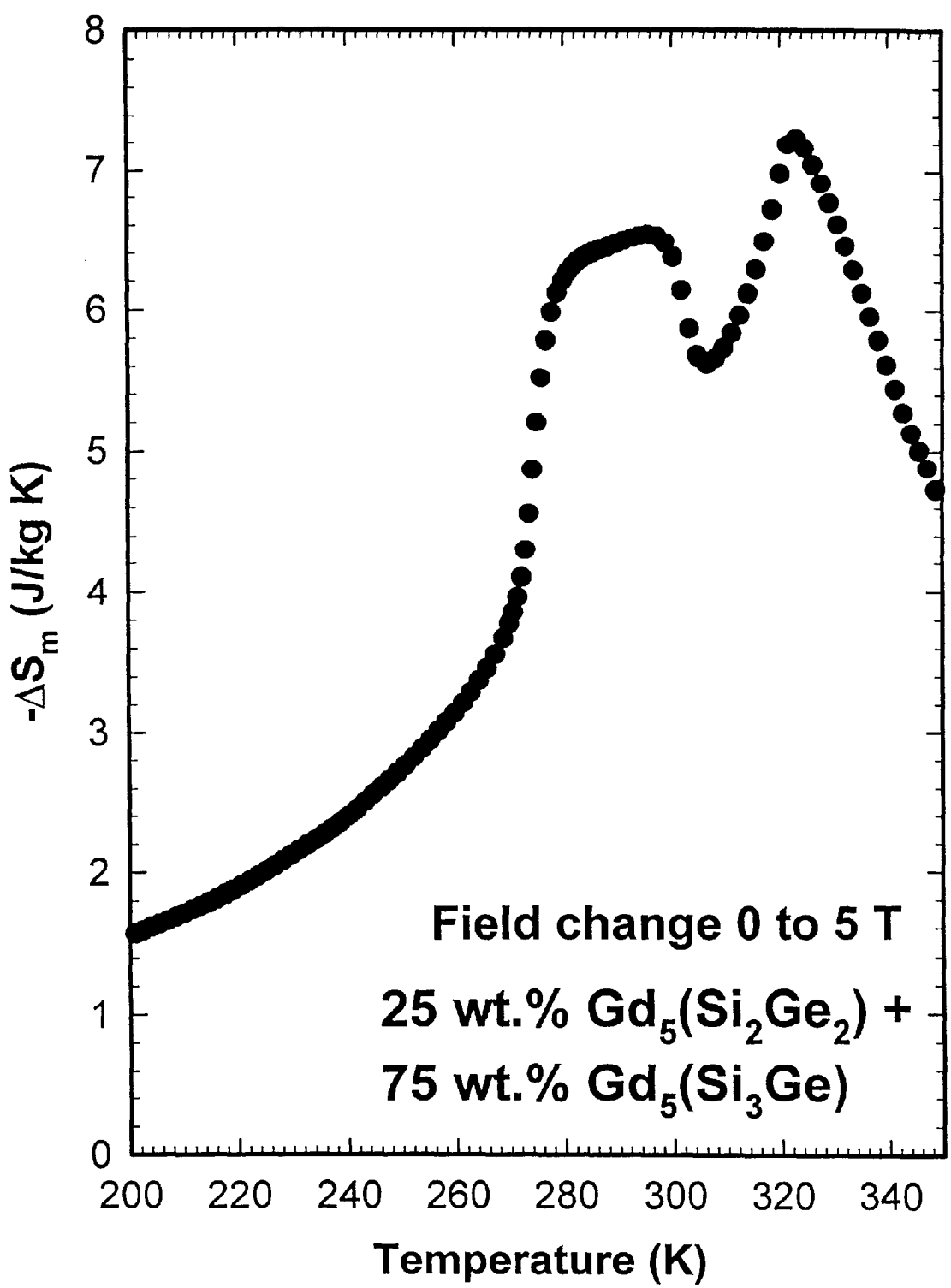
FIG. 21b illustrates the magnetocaloric effect, $-\Delta S_m$, vs. temperature for a two layered regenerator bed (or for a dual stage cooling device) using $Gd_5(Si_3Ge)$ as the high temperature layer (stage) and $Gd_5(Si_2Ge_2)$ as the low temperature layer (stage).
Figure 22:
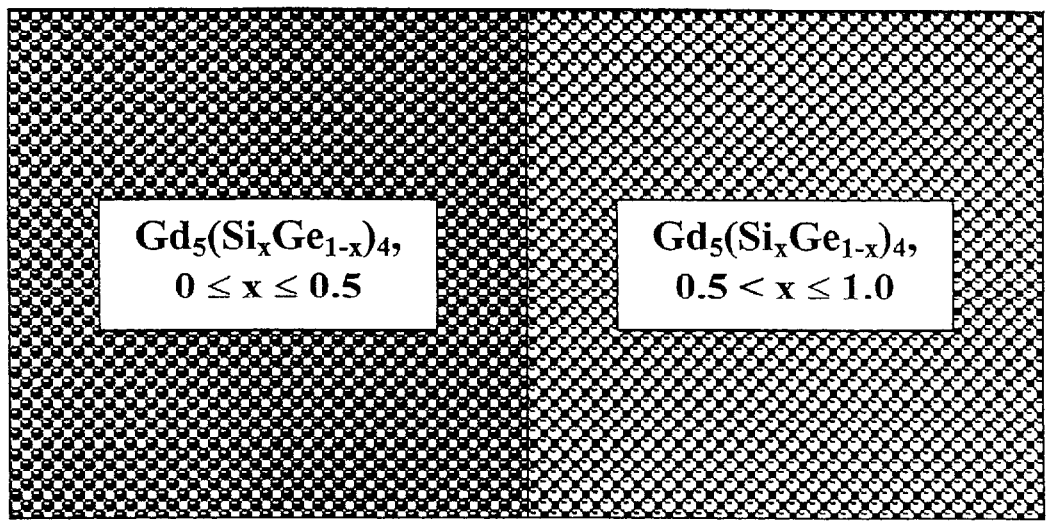
FIG. 22 is a view of a multilayered bed including a layer of $Gd_5(Si_xGe_{1-x})_4$ where $0.525 < x \leq 1.0$ and another layer of $Gd_5(Si_xGe_{1-x})_4$ where $0 \leq x \leq 0.525$.

The $Gd_5(Si_xGe_{1-x})_4$ alloys for $0.5<x\leq1.0$ can be used as a regenerator material layer in either a multilayered regenerator bed or as a regenerator material of a multistage cooling device as the high temperature layer or stage in combination with a common low temperature regenerator material, such as gadolinium or $Gd_5(Si_2Ge_2)$ or other convenient magnetocaloric material, to provide cooling down to about 260 K with heat rejection at about 350 K. FIG. 22 illustrates a multilayered bed including a layer or stage of $Gd_5(Si_xGe_{1-x})_4$ where $0.5<x\leq1.0$ and another layer of $Gd_5(Si_xGe_{1-x})_4$ where $0\leq x\leq0.525$. The magnetocaloric effect ($-\Delta S_m$) for two different bilayered regenerator beds, or two stage refrigerators is shown in FIGS. 21a and 21b. More complex systems can be used to extend the low temperature limit, and/or improve the efficiency by adding more layers to the regenerator beds, but still using one or more of the $Gd_5(Si_xGe_{1-x})_4$ alloys with $0.5<x\leq1.0$ at the high temperature end of the regenerator bed, or for the hot temperature stage of a multistage device. Two such examples are discussed below.

For an automotive air conditioner, the ambient temperature to which the heat must be exhausted into can be as high as 338 K (65 degrees C.) under the hood of a car with engine running in a desert. For this phase one would use $Gd_5Si_4$ ($T_C$=335 K [62 degrees C., 144 degrees F]) as the high temperature layer (stage) in a multilayer regenerator (multistage device). The low temperature stage would be Gd, or some $Gd_{1-y}R_y$ (R=a lanthanide or yttrium or scandium metal) alloy with $0.05 \leq y < 0.2$. One might also want to include an intermediate layer (stage) and likely candidate materials would be $Gd_5(Si_xGe_{1-x})_4$ for x ranging from 0.625 [$Gd_5(Si_{2.5}Ge_{1.5})$] to x=0.875 [$Gd_5(Si_{3.5}Ge_{0.5})$].

For a home air conditioner or refrigerator/freezer the ambient exhaust temperature is 308 K (35 degrees C.). In this case the high temperature layer would be a $Gd_5(Si_xGe_{1-x})_4$ alloy with x ranging from 0.5 to 0.75 [$Gd_5(Si_2Ge_2)$ to $Gd_5(Si_3Ge)$]. The low temperature alloy would be a $Gd_{1-y}R_y$ alloy with y depending on R (rare earth element) and the desired Curie temperature for the particular application. If the application involves freezing then one might want to use an intermediate layer (stage) to improve the operation characteristics and efficiency of the unit.

One could also use various combinations of the $Gd_5(Si_xGe_{1-x})_4$ for $0.5 < x \leq 1.0$ as a heat pump along with Gd or $Gd_{1-y}R_y$ alloys to reach temperatures of about 360 K.

In the above examples one could replace Gd and $Gd_{1-y}R_y$ alloys with the giant magnetocaloric alloys $Gd_5(Si_xGe_{1-x})_4$ for $0.375 \leq x \leq 0.525$, i.e. between $Gd_5(Si_{1.5}Ge_{2.5})$ and $Gd_5(Si_{2.1}Ge_{1.9})$, as the low temperature layer(s) [or stages], for example, compare FIGS. 21a and 21b.

Figure 17:
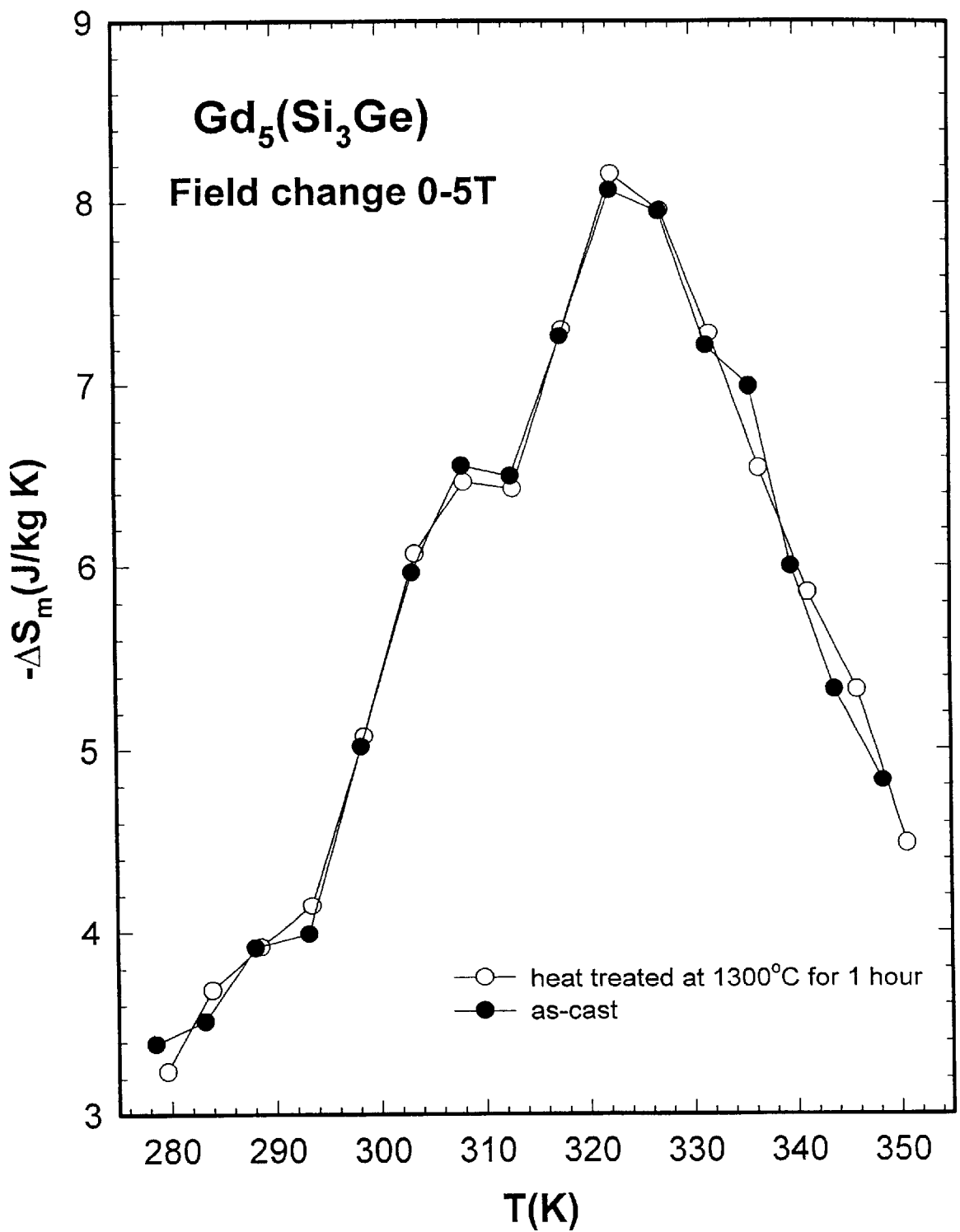
FIG. 17 illustrates the magnetocaloric effect ($-\Delta S_m$) for two $Gd_5(Si_3Ge)$ samples prepared by arc-melting high purity (low C and O) (AL) gadolinium metal plus Si and Ge, one in the as-cast condition and the second after annealing at 1300 degrees C. for one hour.
Figure 18:
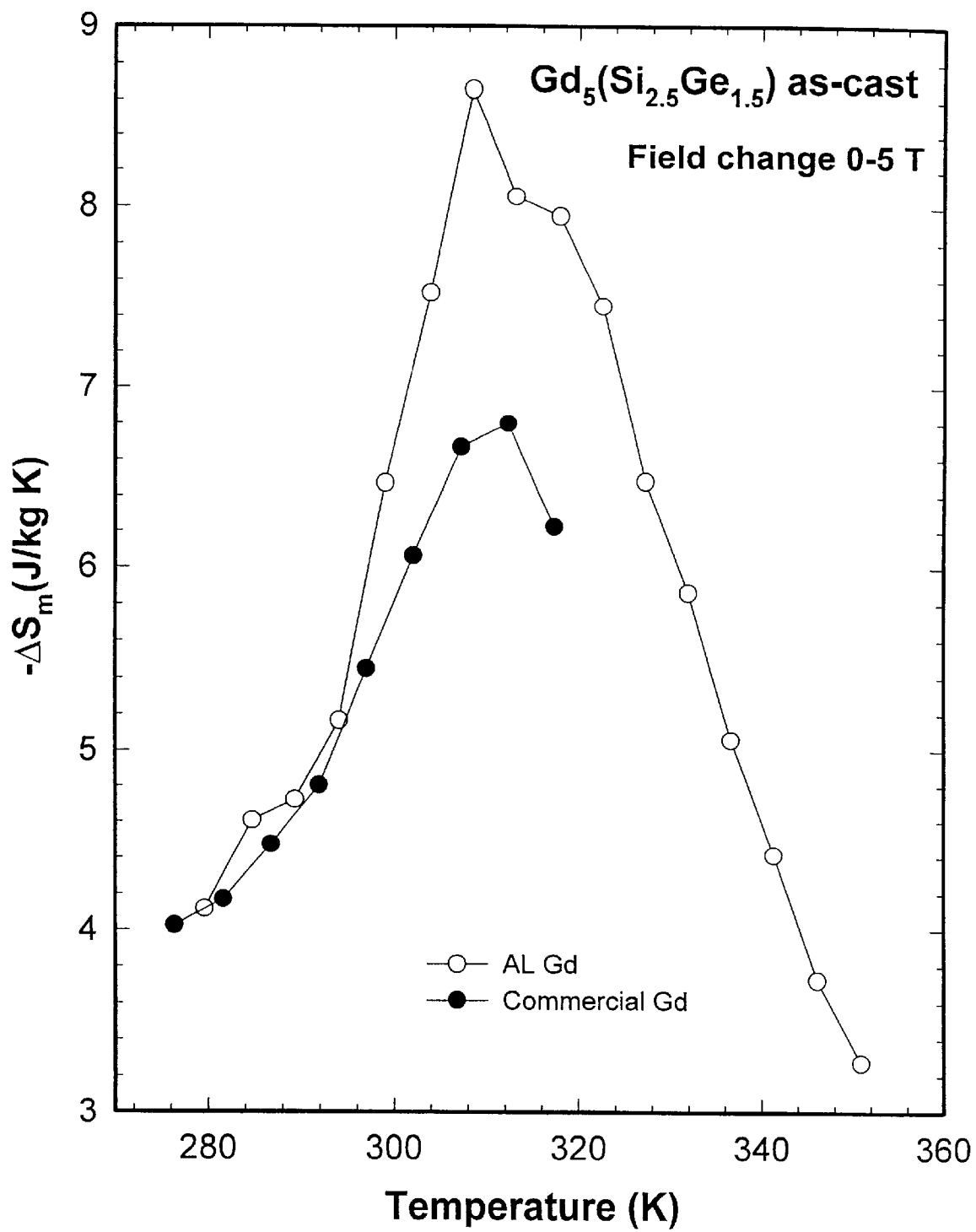
FIG. 18 illustrates the magnetocaloric effect ($-\Delta S_m$) for a $Gd_5(Si_{2.5}Ge_{1.5})$ sample prepared by arc-melting low C and O (AL) gadolinium plus Si and Ge and a $Gd_5(Si_{2.5}Ge_{1.5})$ sample prepared by arc-melting commercial gadolinium plus Si and Ge. Both samples are in the as-cast condition.
Figure 19:
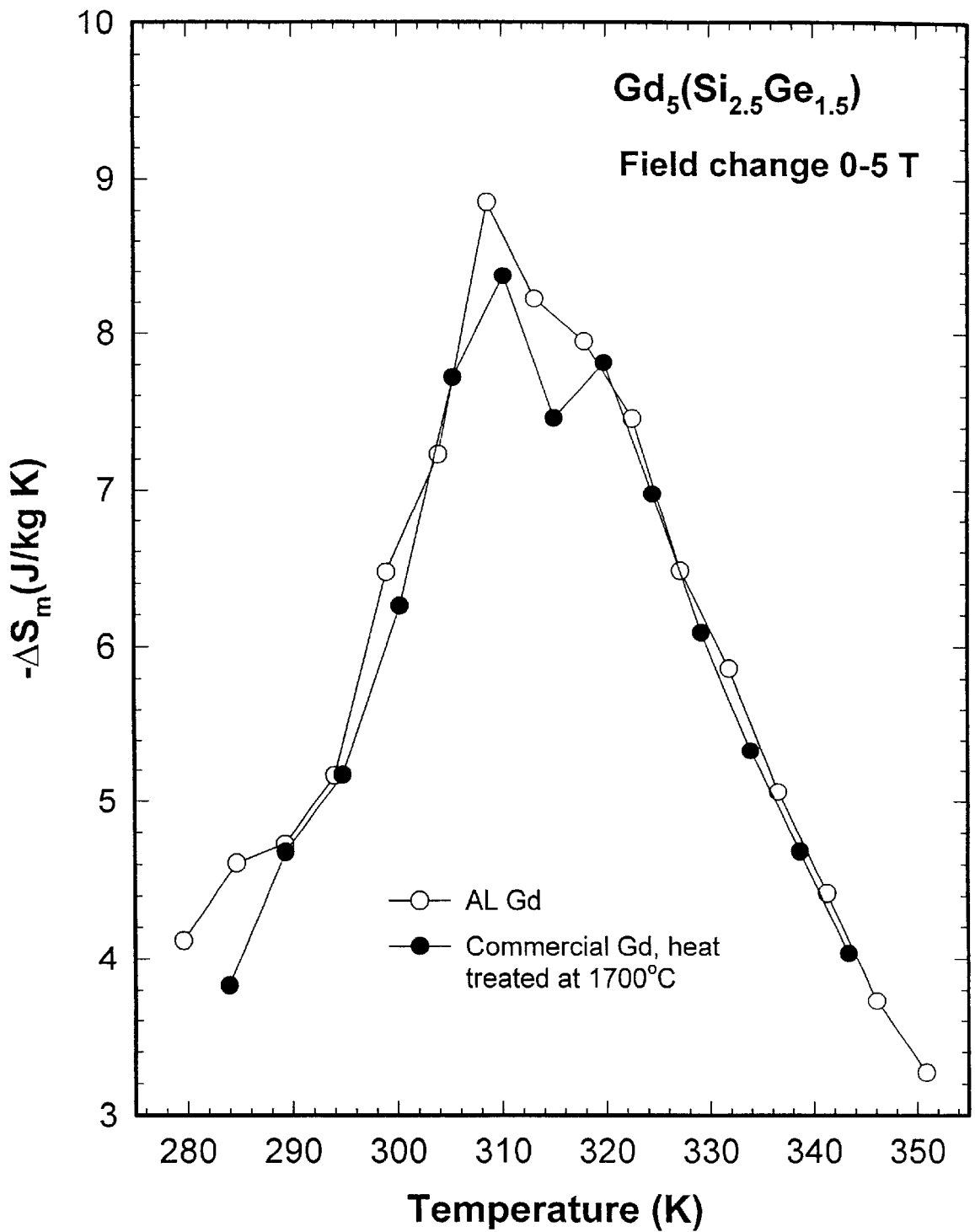
FIG. 19 illustrates the magnetocaloric effect ($-\Delta S_m$) for two $Gd_5(Si_{2.5}Ge_{1.5})$ samples. One sample was prepared by arc-melting high purity (low C and O) (AL) gadolinium plus Si and Ge in the as-cast condition. The other sample was prepared by arc-melting commercial grade gadolinium plus Si and Ge (see FIG. 18) followed by a 4 hour heat treatment at 1700 degrees C., and then rapid cooling.
Figure 20:
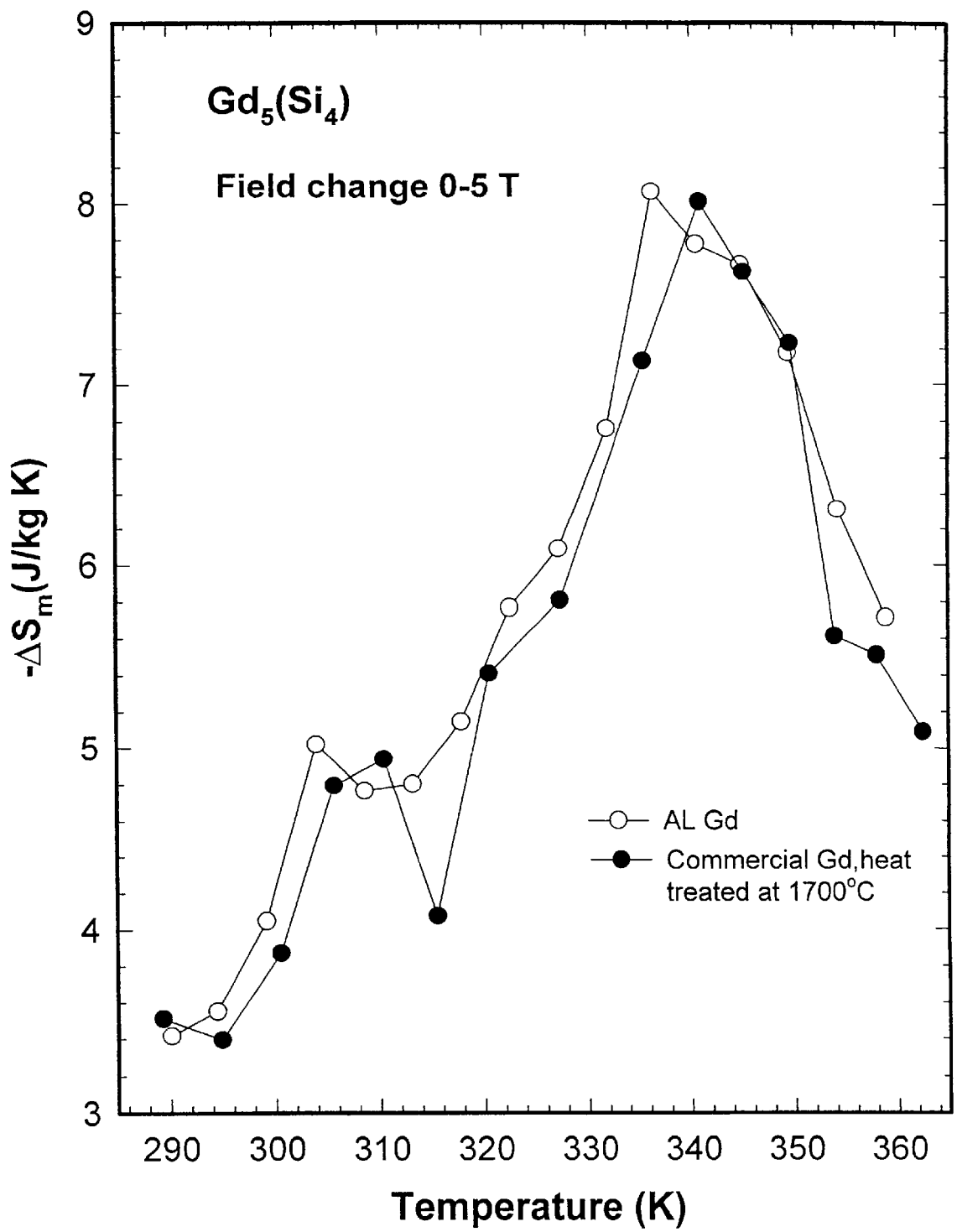
FIG. 20 illustrates the magnetocaloric effect ($-\Delta S_m$) for two $Gd_5Si_4$ samples. One sample is in the as-cast condition. It was prepared by arc-melting low C and O (AL) gadolinium plus Si. The second $Gd_5Si_4$ sample was prepared from commercial grade gadolinium by arc-melting the two constituents, then heat treated for 4 hours at 1700 degrees C., followed by rapid cooling to room temperature.

Modified Method for Preparing $Gd_5(Si_xGe_{1-x})_4$ Alloys, Where $0.5 < x \leq 1.0$ From Commercial Gadolinium In the high Si to Ge ratio, i.e. >1.0, $Gd_5(Si_xGe_{1-x})_4$ alloys (i.e. x>0.5), the effect of carbon impurities is not so deleterious to the magnetocaloric properties as described earlier, see Carbon Effect, for a low Si to Ge ratio, i.e. <1.0 ($x \leq 0.525$). The presence of carbon may reduce the magnetocaloric effect by only a few percent. This means that it is not necessary to hold the alloy in the molten state (i.e. between 1850 and 1900 degrees C.—the melting point of these alloys varies from ~1810 degrees C. at x=0.5 to ~1840 degrees C. at x=1.0.) for one hour before rapidly cooling to 1400 degrees C. Instead, the melt can be held for 15 minutes or less at the melting temperature long enough to homogenize the alloy chemistry. Also annealing between 1000 to 1600 degrees C. to enhance the magnetocaloric effect does not seem to lead to a large improvement in the magnetocaloric properties (see FIG. 17) as observed for the alloys with $x \leq 0.525$, and this step for the most part can be skipped in practice of the invention for these high Si to Ge ratio alloys (but see below). The rest of the procedures described before are still necessary: rapid cooling through the solidification stage of the alloy to prevent segregation; and rapid cooling from 800 to 200 degrees C. to prevent the eutectoid decomposition the 5:4 (Gd to [Si+Ge] ratio) phase to 1:1 and 5:3 phases. FIG. 18 shows a comparison of the magnetocaloric effect ($-\Delta S_m$) of a $Gd_5(Si_{2.5}Ge_{1.5})$ sample, which was prepared by induction melting in a Ta crucible at $10^{-6}$ torr using commercial Gd without the anneals (temperature holds) in the molten state and in the solid between 1000 and 1600 degrees C. range, with a $Gd_5(Si_{2.5}Ge_{1.5})$ sample prepared by arc-melting using a low C and O Ames Laboratory (AL) Gd metal. As one can see the magnetocaloric effect of the sample prepared from commercial Gd is about 20% less than that of a sample made from high purity Gd metal in the as-cast condition. This is due to the high impurity (e.g. C) content in the commercial gadolinium. Heat treating the $Gd_5(Si_{2.5}Ge_{1.5})$ and the $Gd_5Si_4$ alloys prepared from commercial gadolinium at 1000 degrees C. for 3 days does not result in any improvement in the magnetocaloric properties over the as-cast material. However, when annealed above 1600 degrees C. for a few hours and then rapidly cooled these alloys have magnetocaloric properties equivalent to the corresponding samples prepared from low C and O Ames Laboratory gadolinium in the as-cast condition, see FIGS. 19 and 20. This improvement can be attributed to the homogenization of the alloy, and/or stress relief, and/or grain purification by diffusion of the impurities out of the grains and precipitation of same in the grain boundaries.

EXAMPLE 3

Preparation of 1 kg of $Gd_5(Si_3Ge)$ magnetic refrigerant with a magnetocaloric effect between 300 and 360 K in magnetic fields varying between 0 and 5 T.

1. Density of the $Gd_5(Si_3Ge)$ alloy is 7.28 g/cm³. Therefore, 1 kg of the prepared alloy will have an approximate volume of 129 cm³. The total crucible volume should not be less than 270 cm³ and preferably should be 300 cm³ or more. Therefore, a crucible of at least 3.1 cm diameter and at least 10 cm tall should be chosen and out-gassed between 1000 and 1800 degrees C. for 30 minutes.

2. The $Gd_5(Si_3Ge)$ alloy contains 83.369 wt. % Gd, 8.934 wt. % Si, and 7.697 wt. % Ge. Therefore, the crucible (see item 1, above) is initially loaded with ~100 g of previously prepared $Gd_5(Si_3Ge)$ to prevent the reaction of molten Gd with Ta before the Gd reacts with the Si and Ge to form the ternary compound. Then it is loaded successively with 833.69±0.01 g of commercially available Gd, with 89.34±0.01 g of commercially available Si, and finally the crucible is loaded with 76.97±0.01 g of commercially available Ge. When loading of the elemental components is complete, the crucible with its content is loosely covered with Ta lid and is placed inside an induction furnace reaction chamber. A thermocouple calibrated in the temperature range between the room temperature and at least 1900 degrees C. is placed in close vicinity of the crucible (the gap between the thermocouple jacket and the outside of the crucible should be between 0.1 and 1 mm) and at one half of the height of the alloy in the crucible after it has been melted.

3. When the crucible loading is complete, the reaction chamber is evacuated allowing the pressure inside the reaction chamber to reach $10^{-5}$ to $10^{-6}$ torr.

4. When reaction chamber vacuum reaches $10^{-5}$ to $10^{-6}$ torr residual pressure, an induction coil is energized allowing the temperature of Ta crucible loaded with elemental Gd, Si, and Ge, and loosely covered with a Ta lid (see item 2, above) to increase above 300 degrees C. or higher.

5. When the temperature of the crucible exceeds 300 degrees C. a sudden increase in the reaction chamber pressure occurs, the induction coil power is held constant allowing enough time for out-gassing of elemental Gd, Si, and Ge and the pressure to return to $10^{-5}$ to $10^{-6}$ torr. Then the power is ramped again until the temperature of the crucible reaches approximately 940 degrees C.

6. At approximately 940 degrees C. elemental Ge melts and flows to the bottom of the crucible dissolving some Si and reacting with Gd. This usually releases some heat due to the reactions $x$Gd+$y$Ge=$Gd_xGe_y$ and $x$Gd+$y$($Si_zGe_{1-z}$)=$Gd_x(Si_zGe_{1-z})_y$, where x=1 or 5, y=1, 2, 3, or 4, and z is between 0 and 1, and the temperature of the crucible spontaneously increases. The power to the induction coil is reduced by 1 to 50% depending on the rate of spontaneous temperature increase.

7. When the temperature of the crucible is stabilized, or when it begins to decrease, this indicates that the chemical reactions mentioned in item 6 are complete, and the power of the induction furnace is again increased ramping the temperature above 940° C.
8. Between 940 degrees C. and 1870 degrees C. (the later being the target temperature) one or more spontaneous temperature increases can occur indicating the melting of the $Si_zGe_{1-z}$ solid solution and the remaining Si, and the additional chemical reactions $$x1Gd+y1(Si_zGe_{1-z})=Gd_{x1}(Si_zGe_{1-z})$$ and $$x2Gd_x(Si_zGe_{1-z})+y2Si=Gd_{x3}(Si_{z1}Ge_{1-z1})_{y3}$$

which release the remaining heat of the final reaction $$5Gd+3Si+Ge=Ge_5(Si_3Ge)$$

Spontaneous increases in temperature generally are not observed above melting temperature of Si (1414 degrees C.). In each case when spontaneous temperature increase occurs, the power to the induction furnace is manipulated as described in items 6 and 7, above.
9. When the temperature of the crucible reaches 1870 degrees C., the furnace is held at constant power without allowing temperature fluctuations exceeding ±10 degrees C. for 15 minutes to insure the melt is homogeneous.
10. After 15 minutes the furnace power is rapidly reduced to zero allowing the molten $Gd_5(Si_3Ge)$ alloy to rapidly solidify, which prevents macroscopic segregation.
11. When the temperature of the crucible falls below 1600 degrees C., the induction coil is re-energized and the crucible temperature with the solidified $Gd_5(Si_3Ge)$ alloy is stabilized at 1700 degrees C. and held for 1 to 4 hours. The cooling process is continued allowing the sample to cool to room temperature as rapidly as possible to prevent the eutectoid decomposition of the $Gd_5(Si_3Ge)$ alloy using a variety of techniques to enhance the cooling process, such as described in Example 2, item 12. The crucible is then extracted from the reaction chamber and the material is removed from the crucible by gently pounding on the walls and the bottom of the crucible. Two samples (one from the top and one from the bottom portions of the ingot) are taken and their magnetization behavior in the range 300 to 360 K are measured. The magnetocaloric effect is then calculated to ensure that the obtained ingot is homogeneous and displays the appropriate magnetocaloric effect.

The references listed below are incorporated herein by reference.

It will be understood that the above description of the invention is susceptible to various modifications, changes, and adaptations, and the same are intended to be comprehended within the scope of the appended claims.

References

1. E. M. Levin, V. K. Pecharsky, and K. A. Gschneidner, Jr., "Magnetic field and temperature dependencies of the electrical resistance near the magnetic crystallographic first order phase transition of $Gd_5(Si_2Ge_2)$", Phys. Rev. B 60, 7993–7997 (1999).
2. V. K. Pecharsky and K. A. Gschneidner, Jr., "Phase relationships and Crystallography in the Pseudobinary System $Gd_5Si_4$-$Gd_5Ge_4$", J. Alloys Compds. 260, 98–106 (1997).
3. V. K. Pecharsky and K. A. Gschneidner, Jr., "Tunable Magnetic Regenerator Alloys with a Giant Magnetocaloric Effect for Magnetic Refrigeration from ~20 to ~290K", Appl. Phys. Lett. 70, 3299–3301 (1997).
4. V. K. Pecharsky and K. A. Gschneidner, Jr., "Giant Magnetocaloric Effect in $Gd_5(Si_2Ge_2)$", Phys. Rev. Lett. 78, 4494–4497 (1997).
5. V. K. Pecharsky and K. A. Gschneidner, Jr., "Effect of Alloying on the Giant Magnetocaloric Effect of $Gd_5$ $(Si_2Ge_2)$", J. Magn. Magn. Mater. 167, L179–L184 (1997).
6. T. B. Massalski, Editor-in-Chief, Binary Alloy Phase Diagrams, $2^{nd}$ ed., ASM International, Materials Park, Ohio, (1990).
7. D. H. Dennison, M. J. Tschetter and K. A. Gschneidner, Jr., "The Solubility of Tantalum in Eight Liquid Rare-Earth Metals" J. Less-Common Metals 10, 109–115 (1965).
8. P. Rogl, "Phase Equilibria in Ternary and Higher Order Systems with Rare Earth Elements and Silicon" in Handbook on the Physics and Chemistry of Rare Earths, K. A. Gschneidner, Jr. and L. Eyring, eds., Elsevier Science Publishers, B. V., Amsterdam, pp. 92–94 (1984).

What is claimed is:

1. Method of making a material represented by $Gd_5$ $(Si_xGe_{1-x})_4$ alloy, where $0 \leq x \leq 0.523$ comprising:
   a) placing amounts of Gd, Si, and Ge as charge components in a crucible,
   b) heating the charge components under subambient pressure to form a melt and to oxidize and reduce an amount of carbon impurity present in said Gd charge component, and
   c) solidifying the melt to provide solidified material.
2. The method of claim 1 further including heat treating the solidified material at a temperature below the melting temperature for a time effective to increase a magnetocaloric property thereof.
3. The method of claim 2 the charge components are heated to about 1800 degrees C. ±10 degrees C.
4. The method of claim 3 wherein the charge components are heated in said crucible at a rate effective to permit the charge components to out-gas.
5. The method of claim 3 wherein the charge components are held at about 1800 degrees C. for about 1 hour.
6. The method of claim 1 wherein the charge components are heated to the melting temperature under vacuum.
7. The method of claim 6 including reducing power to an induction coil about said crucible when the temperature of crucible contents rises during heating due to an exothermic reaction of the charge components.
8. The method of claim 1 wherein the melt is solidified rapidly by cooling at a rate of between 360 to 60 degrees C./minute depending upon the mass of the material to avoid segregation.
9. The method of claim 2 wherein the solidified material is heat treated in the crucible.
10. The method of claim 2 wherein the solidified material is heat treated at about 1400 degrees C.±10 degrees C. for 1 to 10 hours.
11. The method of claim 2 wherein the heat treated material is cooled to ambient temperature sufficiently fast to avoid eutectoid decomposition.
12. The method of claim 1 where the Gd charge component comprises at least about 90 atomic % Gd, about 0.03 to about 1 atomic % C, about 0.10 to about 4 atomic % O, about 0.01 to about 1 atomic % N, and about 0.001 to about 1 atomic % all other impurities.
13. The method of claim 1 wherein the charge components are heated in a refractory crucible.

14. Method of making a material represented by $R_5(Si_xGe_{1-x})_4$ where $0 \leq x \leq 1.0$, and where R is one or a combination of rare earth elements selected from the group consisting of Gd, Sc, Y, La, Ce, Pr, Nd, Sm, Eu, Tb, Dy, Ho, Er, Tm, Yb, and Lu, comprising:
  a) placing amounts of R, Si, and Ge as charge components in a crucible,
  b) heating the charge components under subambient pressure to form a melt and to reduce an amount of an interstitial element present in the charge component comprising R, and
  c) solidifying the melt to provide solidified material.

15. The method of claim 14 wherein the R charge component includes carbon impurity of about 0.03 atomic % and greater.

16. The method of claim 14 wherein said crucible comprises a refractory material.

17. The method of claim 14 including solidifying the melt in the crucible at a rate to avoid segregation.

18. The method of claim 14 including heat treating the solidified material at a temperature below the melting temperature and then cooling to ambient temperature sufficiently fast to avoid eutectoid decomposition.

19. The method of claim 14 wherein the charge components are heated at a rate to effective to permit the charge components to out-gas.

20. A method of making a material represented by $R_5(Si_xGe_{1-x})_4$ where R is one or a combination of rare earth elements selected from the group of Gd, Sc, Y, La, Ce, Pr, Nd, Sm, Eu, Tb, Dy, Ho, Er, Tm, Yb, and Lu, $0 \leq x \leq 1.0$, comprising heat treating solidified $R_5(Si_xGe_{1-x})_4$ material at a temperature for a time to increase a magnetocaloric property.

21. The method of claim 20 where said material is heated in a crucible in which said material is solidified.

22. Method of making a material represented by $R_5(Si_xGe_{1-x})_4$ alloy, where R is one or a combination of rare earth elements selected from the group consisting of Gd, Sc, Y, La, Ce, Pr, Nd, Sm, Eu, Tb, Dy, Ho, Er, Tm, Yb, and Lu, and where $0 \leq x \leq 1.0$ comprising:
  a) placing amounts of R, Si, and Ge as charge components in a crucible,
  b) heating the charge components under subambient pressure to form a melt, and
  c) solidifying the melt to provide solidified material.

23. The method of claim 22 further including heat treating the solidified material at a temperature below the melting temperature for a time effective to improve a magnetocaloric property thereof.

24. The method of claim 23 wherein the charge components are heated to about 1870 degrees C. ±10 degrees C.

25. The method of claim 24 wherein the charge components are heated in said crucible at a rate effective to permit the charge components to out-gas.

26. The method of claim 24 wherein the charge components are held at about 1870 degrees C. for about 15 minutes.

27. The method of claim 22 wherein the R charge component includes carbon impurity of about 0.03 atomic % and greater.

28. The method of claim 27 including reducing power to an induction coil about the crucible when the temperature of the crucible contents rises during heating due to an exothermic reaction of the charge components.

29. The method of claim 22 wherein the melt is solidified rapidly by cooling at a rate of between 360 to 60 degrees C./minute depending upon the mass of the material.

30. The method of claim 23 wherein the solidified material is heat treated in the crucible.

31. The method of claim 23 wherein the solidified material is heat treated at about 1400 degrees C.±10 degrees C. for 1 to 10 hours.

32. The method of claim 31 wherein the heat treated material is cooled to ambient temperature fast enough to avoid eutectoid decomposition.

33. The method of claim 22 where the R charge component comprises Gd including at least about 90 atomic % Gd, about 0.03 to about 1 atomic % C, about 0.10 to about 4 atomic % O, about 0.01 to about 1 atomic % N, and about 0.001 to about 1 atomic % all other impurities.

34. The method of claim 22 wherein the charge components are heated in a refractory crucible.

35. In a multi-stage magnetic refrigerator, the combination of a first stage comprising $Gd_5(Si_xGe_{1-x})_4$ material where $0.5 < x \leq 1.0$, and a second stage comprising a different material.

36. In a multi-layered regenerator bed, the combination of a first layer comprising $Gd_5(Si_xGe_{1-x})_4$ material where $0.5 < x \leq 1.0$, and a second layer comprising a different material.

* * * * *

UNITED STATES PATENT AND TRADEMARK OFFICE
CERTIFICATE OF CORRECTION

PATENT NO. : 6,589,366 B1
DATED : July 8, 2003
INVENTOR(S) : Karl A. Gschneidner Jr., et al.

It is certified that error appears in the above-identified patent and that said Letters Patent is hereby corrected as shown below:

Column 24,
Line 24, replace "0.523" with -- 0.525 --.
Line 36, after "2" insert -- wherein --.

Signed and Sealed this

Twenty-eighth Day of October, 2003

JAMES E. ROGAN
*Director of the United States Patent and Trademark Office*